United States Patent
Kang et al.

(10) Patent No.: US 9,838,101 B2
(45) Date of Patent: Dec. 5, 2017

(54) METHOD OF REPORTING CHANNEL STATE INFORMATION FOR VERTICAL BEAMFORMING IN A MULTICELL BASED WIRELESS COMMUNICATION SYSTEM AND APPARATUS THEREFOR

(71) Applicant: LG ELECTRONICS INC., Seoul (KR)

(72) Inventors: Jiwon Kang, Anyang-si (KR); Sungho Park, Anyang-si (KR); Jaehoon Chung, Anyang-si (KR); Sunam Kim, Anyang-si (KR); Soocheol Kyeong, Anyang-si (KR); Jinmin Kim, Anyang-si (KR); Kitae Kim, Anyang-si (KR); Kyunghaeng Lee, Anyang-si (KR); Hyunsoo Ko, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 96 days.

(21) Appl. No.: 14/767,816

(22) PCT Filed: Aug. 20, 2013

(86) PCT No.: PCT/KR2013/007450
§ 371 (c)(1),
(2) Date: Aug. 13, 2015

(87) PCT Pub. No.: WO2014/137043
PCT Pub. Date: Sep. 12, 2014

(65) Prior Publication Data
US 2015/0381252 A1    Dec. 31, 2015

Related U.S. Application Data

(60) Provisional application No. 61/773,071, filed on Mar. 5, 2013.

(51) Int. Cl.
*H04B 7/06* (2006.01)
*H04B 7/024* (2017.01)
*H04B 7/0456* (2017.01)

(52) U.S. Cl.
CPC .......... *H04B 7/0617* (2013.01); *H04B 7/024* (2013.01); *H04B 7/0456* (2013.01);
(Continued)

(58) Field of Classification Search
CPC .. H04B 7/0617; H04B 7/0626; H04B 7/0632; H04B 7/0639; H04B 7/024; H04B 7/0456; H04B 7/0619
See application file for complete search history.

(56) References Cited

U.S. PATENT DOCUMENTS

2009/0080546 A1    3/2009  Zhao et al.
2010/0303039 A1*   12/2010 Zhang .................. H04L 5/0035
                                                         370/331
(Continued)

FOREIGN PATENT DOCUMENTS

EP          2482582 A1    8/2012
JP       2012-138753 A    7/2012
(Continued)

OTHER PUBLICATIONS

R1-084286, titled Title: Enhanced Beamforming Technique for LTE-A, Agenda Item: 11.3 was published during 3GPP TSG RAN WG1 meeting #55 R1-084286, Prague, Czech Republic, Nov. 10-14, 2008.*

(Continued)

*Primary Examiner* — Andrew Lai
*Assistant Examiner* — Hoyet H Andrews, III
(74) *Attorney, Agent, or Firm* — Birch, Stewart, Kolasch & Birch, LLP

(57) ABSTRACT

A method of reporting a channel state from a user equipment in a wireless communication system and apparatus therefor (Continued)

are disclosed. The present invention includes receiving information on vertical beamforming angles of a serving node and a cooperation node from the serving node, generating the channel state information for a cooperative transmission mode using the information on the vertical beamforming angle, and reporting the channel state information to the serving node.

13 Claims, 14 Drawing Sheets

(52) U.S. Cl.
CPC ......... *H04B 7/0619* (2013.01); *H04B 7/0626* (2013.01); *H04B 7/0632* (2013.01); *H04B 7/0639* (2013.01)

(56) References Cited

U.S. PATENT DOCUMENTS

| | | | |
|---|---|---|---|
| 2011/0081901 A1* | 4/2011 | Moulsley | H04B 7/024 455/422.1 |
| 2011/0194540 A1* | 8/2011 | Baligh | H04L 1/0071 370/337 |
| 2012/0099674 A1* | 4/2012 | Moulsley | H04B 7/024 375/296 |
| 2012/0106610 A1* | 5/2012 | Nogami | H04B 7/024 375/224 |
| 2012/0176884 A1* | 7/2012 | Zhang | H04B 7/024 370/203 |
| 2012/0188976 A1* | 7/2012 | Kim | H04L 1/0025 370/329 |
| 2013/0114763 A1 | 5/2013 | Park | |
| 2013/0272250 A1 | 10/2013 | Shimezawa et al. | |

FOREIGN PATENT DOCUMENTS

| | | | | |
|---|---|---|---|---|
| KR | 10-2012-0003781 A | 1/2012 | | |
| WO | WO 2012/090851 A1 | 7/2012 | | |
| WO | WO 2012/100856 A1 | 8/2012 | | |
| WO | WO 2012/158959 A1 | 11/2012 | | |
| WO | WO 2012158959 A1 * | 11/2012 | ........... | H04B 7/0617 |
| WO | WO 2013/024350 A2 | 2/2013 | | |

OTHER PUBLICATIONS

R1-082972, titled, Enhanced Beamforming Technique for LTE-A, Agenda Item: 12 was published during 3GPP TSG RAN WG1 meeting #54 R1-082972, Jeju, Korea, Aug. 18-22, 2008.*
M Tao et al., titled "A Network Flow Approach to Throughput Maximization in Cooperative OFDMA Networks," in IEEE Transactions on Wireless Communications, vol. 12, No. 3, pp. 1138-1148, Feb. 4, 2013. doi: 10.1109/TWC.2013.012413.120403.*

* cited by examiner (a) Control-plane protocol stack (b) User-plane protocol stack (a) Existing antenna system   (b) Active antenna system

METHOD OF REPORTING CHANNEL STATE INFORMATION FOR VERTICAL BEAMFORMING IN A MULTICELL BASED WIRELESS COMMUNICATION SYSTEM AND APPARATUS THEREFOR

CROSS REFERENCE TO RELATED APPLICATIONS

This application is the National Phase of PCT International Application No. PCT/KR2013/007450, filed on Aug. 20, 2013, which claims priority under 35 U.S.C. 119(e) to U.S. Provisional Application No. 61/773,071, filed on Mar. 5, 2013, all of which are hereby expressly incorporated by reference into the present application.

TECHNICAL FIELD

The present invention relates to a wireless communication system, and more particularly, to a method of reporting channel state information for vertical beamforming in a multicell based wireless communication system and apparatus therefor.

BACKGROUND ART

3GPP LTE (3rd generation partnership projecting long term evolution) communication system is schematically described for one example of a wireless communication system to which the present invention is applicable.

FIG. 1 is a schematic diagram of E-UMTS network structure as an example of a wireless communication system. E-UMTS (evolved universal mobile telecommunications system) is the system evolved from a conventional UMTS (universal mobile telecommunications system) and its basic standardization is progressing by 3GPP. Generally, E-UMTS can be called LTE (long term evolution) system. For the details of the technical specifications of UMTS and E-UMTS, Release 7 and Release 8 of '3rd Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service.

At least one or more cells exist in one base station. The cell is set to one of bandwidths including 1.25 MHz, 2.5 MHz, 5 MHz, 10 MHz, 15 MHz, 20 MHz and the like and then provides an uplink or downlink transmission service to a plurality of user equipments. Different cells can be set to provide different bandwidths, respectively. A base station controls data transmissions and receptions for a plurality of user equipments. A base station sends downlink scheduling information on downlink (DL) data to inform a corresponding user equipment of time/frequency region for transmitting data to the corresponding user equipment, coding, data size, HARQ (hybrid automatic repeat and request) relevant information and the like. And, the base station sends uplink scheduling information on uplink (UL) data to a corresponding user equipment to inform the corresponding user equipment of time/frequency region available for the corresponding user equipment, coding, data size, HARQ relevant information and the like. An interface for a user traffic transmission or a control traffic transmission is usable between base stations. A core network (CN) can consist of an AG, a network node for user registration of a user equipment and the like. The AG manages mobility of the user equipment by a unit of TA (tracking area) including a plurality of cells.

The wireless communication technology has been developed up to LTE based on WCDMA but the demands and expectations of users and service providers are continuously rising. Since other radio access technologies keep being developed, new technological evolution is requested to become competitive in the future. For this, reduction of cost per bit, service availability increase, flexible frequency band use, simple-structure and open interface, reasonable power consumption of user equipment and the like are required.

TECHNICAL PROBLEM

Based on the above-mentioned discussion, a method of reporting channel state information for vertical beamforming in a multicell based wireless communication system and apparatus therefor shall be proposed in the following description.

Technical tasks obtainable from the present invention are non-limited by the above-mentioned technical task. And, other unmentioned technical tasks can be clearly understood from the following description by those having ordinary skill in the technical field to which the present invention pertains.

TECHNICAL SOLUTION

To achieve these and other advantages and in accordance with the purpose of the present invention, as embodied and broadly described, a method of reporting channel state information, which is reported by a user equipment in a wireless communication system, according to one embodiment of the present invention includes the steps of receiving information on vertical beamforming angles of a serving node and a cooperation node from the serving node, generating the channel state information for a cooperative transmission mode using the information on the vertical beamforming angle, and reporting the channel state information to the serving node.

To further achieve these and other advantages and in accordance with the purpose of the present invention, a user equipment in a wireless communication system according to another embodiment of the present invention includes a wireless communication module configured to transceive signals with at least one of a serving node and a cooperation node and a processor configured to process the signals, the processor creates channel state information for a cooperative transmission mode using information on vertical beamforming angles of the serving node and the cooperation node, the processor controlling the wireless communication module to report the channel state information to the serving node.

Preferably, the information on the vertical beamforming angle may include information on at least one cooperative transmission mode determined based on the vertical beamforming angle of the serving node and the vertical beamforming angle of the cooperation node. More preferably, the channel station information may include at least one of information on a specific cooperative transmission mode preferred by the user equipment, channel quality information available for a case of applying the specific cooperative transmission mode and information on the vertical beamforming angle of each of the serving node and the cooperation node.

In addition, the information on the vertical beamforming angle may be represented as a codebook index corresponding to the vertical beamforming angle.

Preferably, the information on the vertical beamforming angles of the serving node and the cooperation node may include information on at least one 1st codebook subset for the serving node and information on at least one 2nd codebook subset for the cooperation node. More preferably, the at least one 1st codebook subset may include a codebook subset corresponding to the vertical beamforming angle, which is equal to or greater than a 1st threshold, of the serving node and the at least one 2nd codebook subset may include a codebook subset corresponding to the vertical beamforming angle, which is equal to or greater than a 2nd threshold, of the cooperation node.

Besides, in order to create the channel state information for the cooperative transmission mode, a 1st precoding matrix index for the serving node and a 2nd precoding matrix index for the cooperation node may be calculated. In doing so, information on a specific cooperative transmission mode included in the channel state information may be determined depending on whether the 1st precoding matrix index is included in the 1st codebook subset and whether the 2nd precoding matrix index is included in the 2nd codebook subset.

The above-mentioned general description of the present invention and the following details of the present invention are exemplary and may be provided for the additional description of the invention disclosed in claims.

ADVANTAGEOUS EFFECTS

Accordingly, the present invention may provide the following effects and/or features.

First of all, according to an embodiment of the present invention, a user equipment can efficiently report channel state information for vertical beamforming in a multicell based wireless communication system.

Effects obtainable from the present invention may be non-limited by the above mentioned effect. And, other unmentioned effects can be clearly understood from the following description by those having ordinary skill in the technical field to which the present invention pertains.

It is to be understood that both the foregoing general description and the following detailed description of the present invention are exemplary and explanatory and are intended to provide further explanation of the invention as claimed.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

MODE FOR INVENTION

Reference will now be made in detail to the preferred embodiments of the present invention, examples of which are illustrated in the accompanying drawings. The embodiments described in the following description include the examples showing that the technical features of the present invention are applied to 3GPP system.

Although an embodiment of the present invention is exemplarily described in the present specification using the LTE system and the LTE-A system, the embodiment of the present invention is also applicable to any kinds of communication systems corresponding to the above definitions. Although an embodiment of the present invention is exemplarily described with reference to FDD scheme in the present specification, the embodiment of the present invention is easily modifiable and applicable to H-FDD or TDD scheme.

In the present specification, a name of a base station can be used as an inclusive terminology for RRH (remote control head), eNB, TP (transmission point), RP (repetition point), RN (relay node) or the like.

Figure 1:
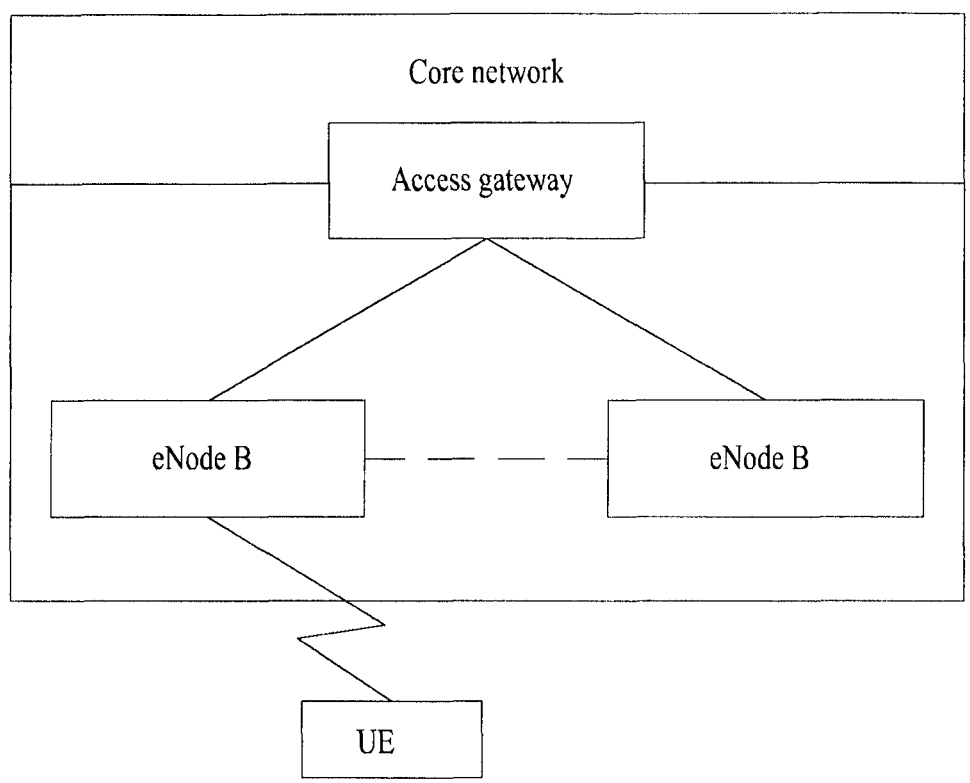
FIG. 1 is a schematic diagram of E-UMTS network structure as an example of a mobile communication system.
Figure 2:
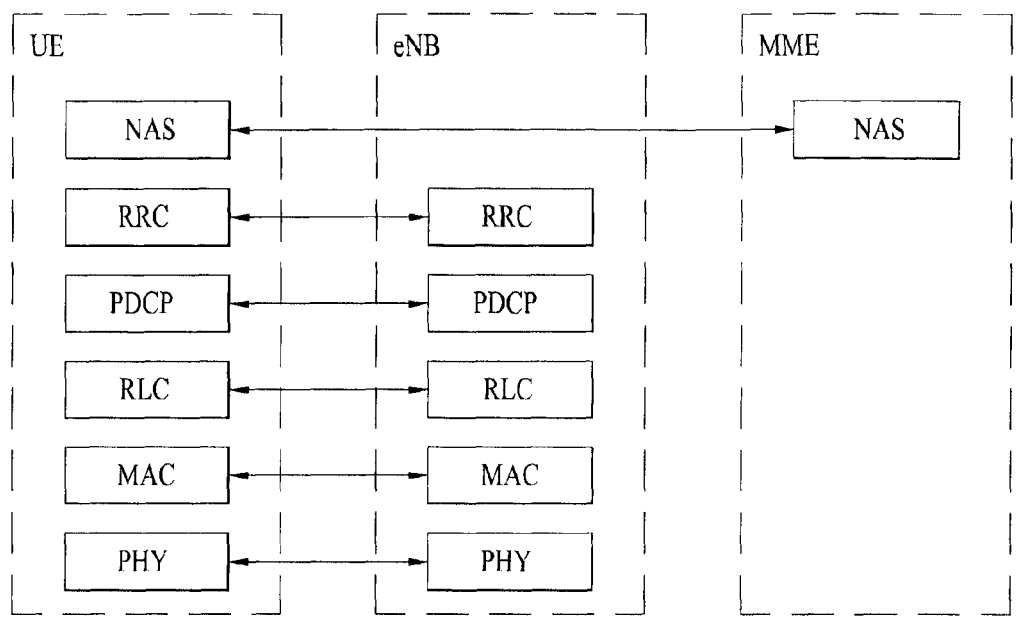
FIG. 2 is a diagram of structures of control and user planes of a radio interface protocol between a user equipment and E-UTRAN based on 3GPP radio access network specification.
Figure 2:
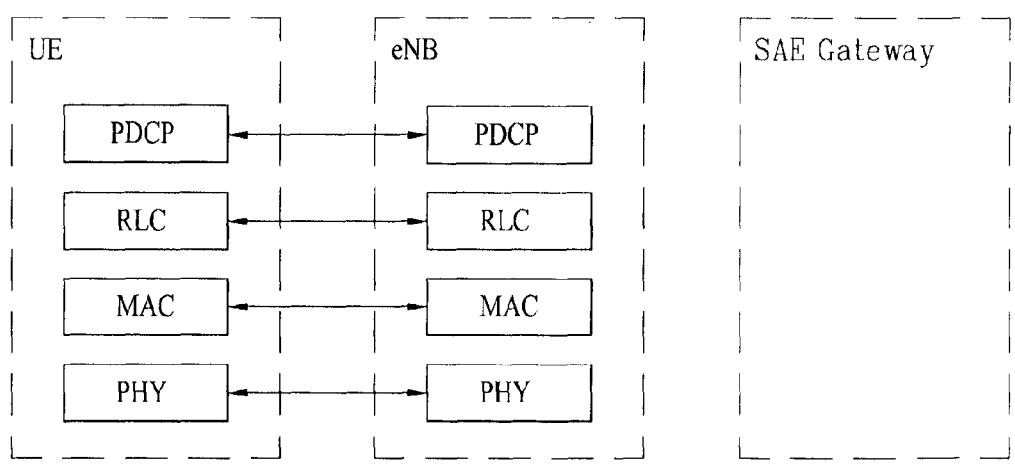

FIG. 2 is a diagram of structures of control and user planes of a radio interface protocol between a user equipment and E-UTRAN based on 3GPP radio access network specification. First of all, a control plane means a passage for transmitting control messages used by a user equipment and a network to manage a call. A user plane means a passage for transmitting such data generated from an application layer as voice data, internet packet data and the like.

A physical layer, i.e., a first layer, provides an information transfer service to an upper layer using a physical channel. The physical layer is connected to a medium access control layer located above via a transport channel. Data are transferred between the medium access control layer and the physical layer via the transport channel. Data are transferred between a physical layer of a transmitting side and a physical layer of a receiving side via a physical channel. The physical channel uses time and frequency as radio resources. In particular, a physical layer is modulated in downlink by OFDMA (orthogonal frequency division multiple access) scheme and is modulated in uplink by SC-FDMA (single carrier frequency division multiple access) scheme.

A medium access control (hereinafter abbreviated MAC) layer of a second layer provides a service to a radio link control (hereinafter abbreviated RLC) layer of an upper layer via a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling logical channel, transport channel and physical channels in association with configuration, reconfiguration and release of radio bearers (RBs). In this case, the RB means a service provided by the second layer for a data transfer between a user equipment and a network. For this, the RRC layer of the user equipment exchanges RRC messages with the RRC layer of the network. In case that an RRC connection is established between an RRC layer of a user equipment and an RRC layer of a network, the user equipment is in a connected mode. Otherwise, the user equipment is in an idle mode. NAS (non-access stratum) layer above an RRC layer performs a function of session management, a function of mobility management and the like.

A downlink transport channel for transporting data to a user equipment from a network includes a broadcast channel (BCH) for transporting system information, a paging channel (PCH) for transmitting a paging message, a downlink shared channel (SCH) for transmitting a user traffic or a control message or the like. A traffic or control message of a downlink multicast or broadcast service can be transmitted via a downlink SCH or a separate downlink multicast channel (MCH). Meanwhile, an uplink transport channel for transmitting data from a user equipment to a network includes a random access channel for transmitting an initial control message, an uplink shared channel (SCH) for transmitting a user traffic or a control message or the like. A logical channel located above a transport channel to be mapped by a transport channel includes BCCH (Broadcast Control Channel), PCCH (Paging Control Channel), CCCH (Common Control Channel), MCCH (Multicast Control Channel), MTCH (Multicast Traffic Channel) or the like.

Figure 3:
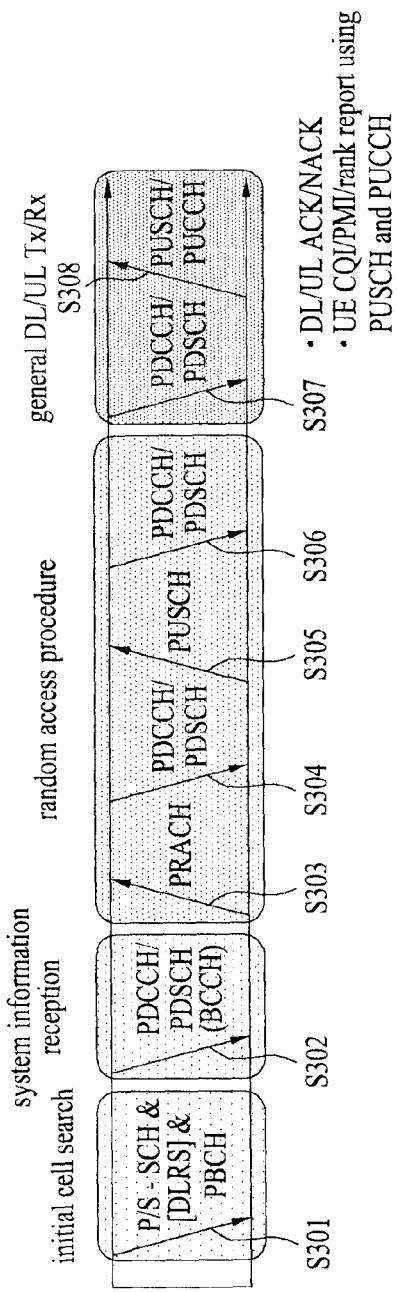
FIG. 3 is a diagram for explaining physical channels used for 3GPP system and a general method of transmitting a signal using the same.

FIG. 3 is a diagram for explaining physical channels used by 3GPP system and a general signal transmitting method using the same.

Referring to FIG. 3, if a power of a user equipment is turned on or the user equipment enters a new cell, the user equipment performs an initial cell search for matching synchronization with a base station and the like [S301]. For this, the user equipment receives a primary synchronization channel (P-SCH) and a secondary synchronization channel (S-SCH) from the base station, matches synchronization with the base station and then obtains information such as a cell ID and the like. Subsequently, the user equipment receives a physical broadcast channel from the base station and is then able to obtain intra-cell broadcast information. Meanwhile, the user equipment receives a downlink reference signal (DL RS) in the initial cell searching step and is then able to check a downlink channel status.

Having completed the initial cell search, the user equipment receives a physical downlink control channel (PDCCH) and a physical downlink shared control channel (PDSCH) according to information carried on the physical downlink control channel (PDCCH) and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. For this, the user equipment transmits a specific sequence as a preamble via a physical random access channel (PRACH) [S303, S305] and is then able to receive a response message via PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. In particular, the user equipment receives a downlink control information (DCI) via PDCCH. In this case, the DCI includes such control information as resource allocation information on a user equipment and can differ in format in accordance with the purpose of its use.

Meanwhile, control information transmitted/received in uplink/downlink to/from the base station by the user equipment includes ACK/NACK signal, CQI (channel quality indicator), PMI (precoding matrix index), RI (rank indicator) and the like. In case of the 3GPP LTE system, the user equipment is able to transmit the above mentioned control information such as CQI, PMI, RI and the like via PUSCH and/or PUCCH.

Figure 4:
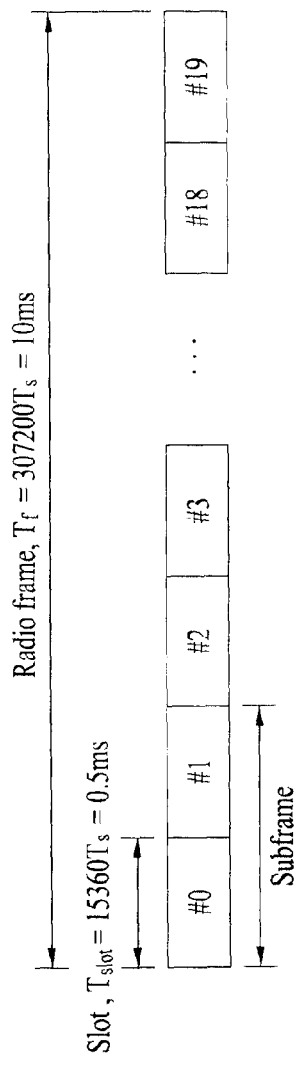
FIG. 4 is a diagram for an example of a structure of a radio frame used for LTE system.

FIG. 4 is a diagram for an example of a structure of a radio frame used by LTE system.

Referring to FIG. 4, a radio frame has a length of 10 ms (327200×Ts) and is constructed with 10 subframes in equal size. Each of the subframes has a length of 1 ms and is constructed with two slots. Each of the slots has a length of 0.5 ms (15360×Ts). In this case, Ts indicates a sampling time and is expressed as Ts=1/(15 kHz×2048)=3.2552×10−8 (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
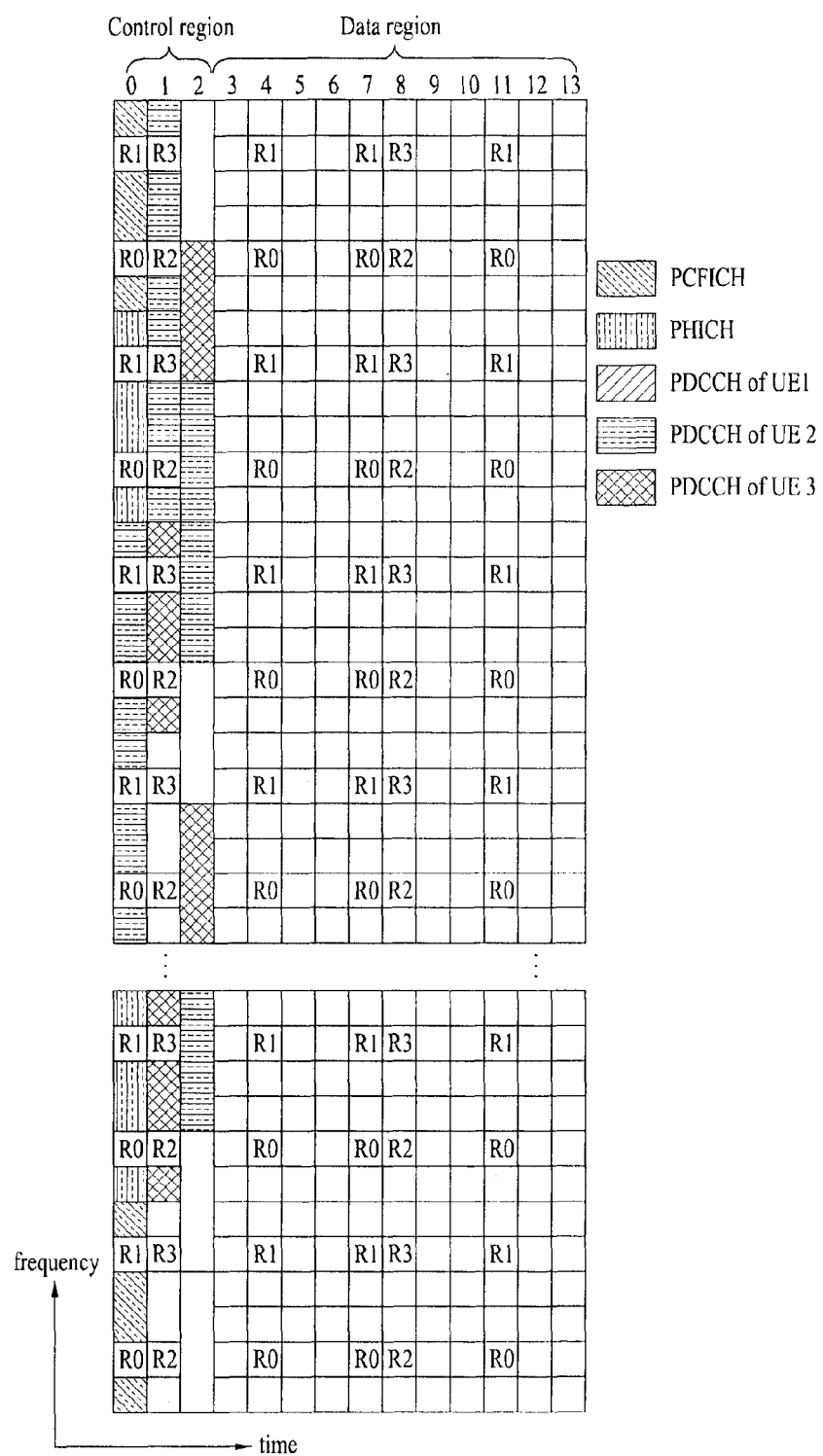
FIG. 5 is a diagram for one example of a structure of a downlink (DL) subframe used by LTE system.

FIG. 5 is a diagram for one example of a control channel included in a control region of one subframe in a downlink (DL) radio subframe.

Referring to FIG. 5, a subframe may include 14 OFDM symbols. First 1 to 3 OFDM symbols may be used as a control region and the rest of 13 to 11 OFDM symbols may be used as a data region, in accordance with subframe configurations. In the drawing, R1 to R4 indicate reference signals (RS) for antennas 0 to 3, respectively. The RS may be fixed to a predetermined pattern in a subframe irrespective of the control region or the data region. The control region may be assigned to a resource, to which the RS is not assigned, in the control region. And, a traffic channel may be assigned to a resource, to which the RS is not assigned, in the data region. Control channels assigned to the control region may include PCFICH (Physical Control Format Indicator CHannel), PHICH (Physical Hybrid-ARQ Indicator CHannel), PDCCH (Physical Downlink Control CHannel) and the like.

The PCFICH is a physical control format indicator channel and informs a user equipment of the number of OFDM symbols used for PDCCH in each subframe. The PCFICH is situated at a first OFDM symbol and is set prior to the PHICH and the PDCCH. The PCFICH is constructed with four resource element groups (REGs). Each of the REGs is distributed within the control region based on a cell ID. One REG is constructed with four REs. In this case, the RE indicates a minimum physical resource defined as '1 subcarrier×1 OFDM symbol'. A value of the PCFICH indicates a value of '1~3' or '2~4' and is modulated by QPSK (quadrature phase shift keying).

The PHICH is a physical HARQ (hybrid-automatic repeat and request) indicator channel and is used in carrying HARQ ACK/NACK for uplink transmission. In particular, the PHICH indicates a channel for carrying DL ACK/NACK information for UL HARQ. The PHICH is constructed with 1 REG and is cell-specifically scrambled. The ACK/NACK is indicated by 1 bit and then modulated by BPSK (binary phase shift keying). The modulated ACK/NACK is spread by 'SF (spreading factor)=2 or 4'. A plurality of PHICHs mapped to the same resource configure a PHICH group. The number of the PHICHs multiplexed into the PHICH group is determined depending on the number of spreading codes. And, the PHICH (group) is repeated three times to obtain a diversity gain in frequency domain and/or time domain.

The PDCCH is a physical downlink control channel and is assigned to first n OFDM symbols of a subframe. In this case, 'n' is an integer equal to or greater than 1 and is indicated by the PCFICH. The PDCCH informs each user equipment or UE group of resource allocation information on transport channels PCH (paging channel) and DL-SCH (downlink-shared channel), uplink scheduling grant, HARQ information and the like. The PCH (paging channel) and the DL-SCH (downlink-shared channel) are carried on the PDSCH. Therefore, a base station or a user equipment normally transmits or receives data via the PDSCH except specific control information or specific service data.

Information indicating that data of the PDSCH is transmitted to a prescribed user equipment (or a plurality of user equipments), information indicating how the user equipments receive and decode PDSCH data, and the like are transmitted by being included in the PDCCH. For instance, assume that a specific PDCCH is CRC masked with RNTI (radio network temporary identity) 'A' and that information on data transmitted using a radio resource 'B' (e.g., frequency position) and transmission format information 'C' (e.g., transport block size, modulation scheme, coding information, etc.) is transmitted via a specific subframe. If so, at least one user equipment located in a corresponding cell monitors PDCCH using RNTI information of its own. If there is at least one user equipment having the RNTI 'A', the user equipments receive the PDCCH and then receive PDSCH indicated by '13' and 'C' through the information of the received PDCCH.

Figure 6:
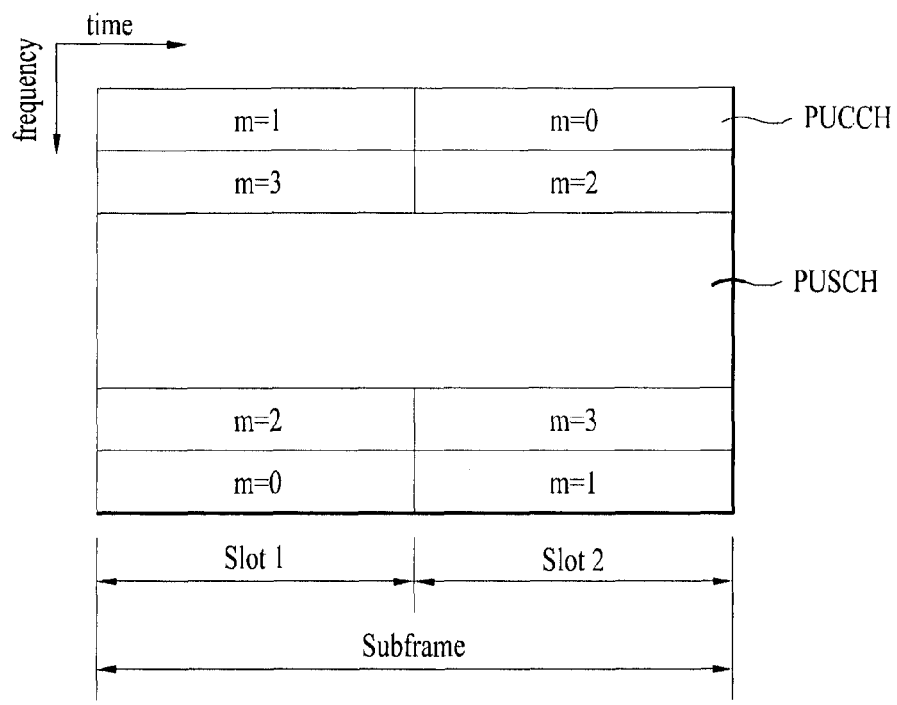
FIG. 6 is a diagram for one example of a structure of an uplink (UL) subframe used by LTE system.

FIG. 6 is a diagram for one example of a structure of an uplink (UL) subframe used by LTE system.

Referring to FIG. 6, a UL subframe may be divided into a region for assigning PUCCH (physical uplink control channel) configured to carry control information and a region for assigning PUSCH (physical uplink shared channel) configured to carry user data. A middle part of a subframe is assigned to the PUSCH and both side parts of a data region in frequency domain are assigned to the PUSCH. The control information carried on the PUCCH may include ACK/NACK used for HARQ, CQI (channel quality indicator) indicating a DL Channel state, an RI (rank indicator) for MIMO, an SR (scheduling request) that is a UL resource allocation request, and the like. The PUCCH for a single user equipment uses a single resource block occupying a different frequency in each slow within a subframe. In particular, a pair of resource blocks assigned to the PUCCH experience frequency hopping on a slot boundary. Specifically, FIG. 6 shows one example that PUCCH (m=0), PUCCH (m=1), PUCCH (m=2), and PUCCH (m=3) are assigned to the subframe.

In the following description, MIMO system is explained. First of all, MIMO (multi-input multi-output) is a method that uses a plurality of transmitting antennas and a plurality of receiving antennas. And, this method may be able to improve efficiency in transceiving data. In particular, a transmitting or receiving stage of a wireless communication system uses a plurality of antennas to increase capacity or enhance performance. In the following description, the MIMO may be called 'multiple antennas (multi-antenna)'.

The MIMO technology does not depend on a single antenna path to receive one whole message. Instead, the MIMO technique completes data by putting fragments received via several antennas together. If the MIMO technique is adopted, a data transmission rate within a cell area having a specific size may be improved or a system coverage may be increased by securing a specific data transmission rate. Moreover, this technique may be widely applicable to a mobile communication terminal, a relay and the like. According to the MIMO technique, it may be able to overcome the transmission size limit of the related art mobile communication which used to use a single data.

Figure 7:
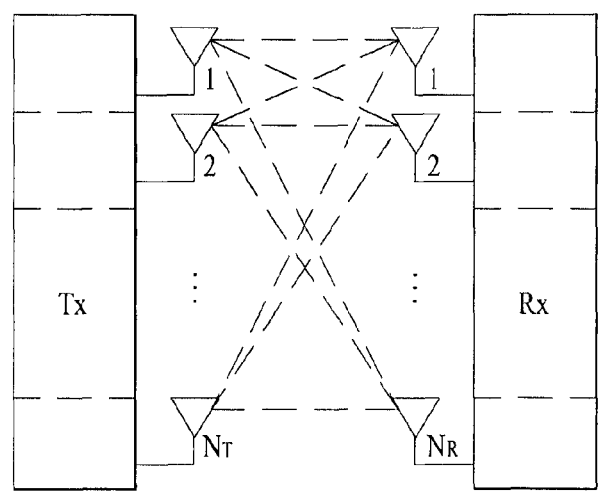
FIG. 7 is a diagram for a configuration of a general multi-antenna (MIMO) communication system.

FIG. 7 is a diagram for a configuration of a general multi-antenna (MIMO) communication system. $N_T$ transmitting antennas are provided to a transmitting stage, while $N_R$ receiving antennas are provided to a receiving stage. In case that each of the transmitting and receiving stages uses a plurality of antennas, theoretical channel transmission capacity is increased more than that of a case that either the transmitting stage or the receiving stage uses a plurality of antennas. The increase of the channel transmission capacity is in proportion to the number of antennas. Hence, a transmission rate is enhanced and frequency efficiency can be raised. Assuming that a maximum transmission rate in case of using a single antenna is set to $R_0$, the transmission rate in case of using multiple antennas may be theoretically raised by a result from multiplying the maximum transmission rate $R_O$ by a rate increasing rate $R_i$, as shown in Formula 1. In this case, $R_i$ is a smaller one of $N_T$ and $N_R$.

$$R_i = \min(N_T, N_R) \quad \text{[Formula 1]}$$

For instance, in an MIMO communication system, which uses 4 transmitting antennas and 4 receiving antennas, it may be able to obtain a transmission rate 4 times higher than that of a single antenna system. After this theoretical capacity increase of the MIMO system has been proved in the middle of 90's, many ongoing efforts are made to various techniques to substantially improve a data transmission rate. And, these techniques are already adopted in part as standards for the 3G mobile communications and various wireless communications such as a next generation wireless LAN and the like.

The trends for the MIMO relevant studies are explained as follows. First of all, many ongoing efforts are made in various aspects to develop and research information theory study relevant to MIMO communication capacity calculations and the like in various channel configurations and multiple access environments, radio channel measurement and model derivation study for MIMO systems, spatiotemporal signal processing technique study for transmission reliability enhancement and transmission rate improvement and the like.

In order to explain a communicating method in an MIMO system in detail, mathematical modeling can be represented as follows. Referring to FIG. 7, assume that $N_T$ transmitting antennas and $N_R$ receiving antennas exist. First of all, regarding a transmission signal, if there are $N_T$ transmitting antennas, $N_T$ maximum transmittable informations exist. Hence, the transmission information may be represented by the vector shown in Formula 2.

$$s = [s_1, s_2, \ldots, s_{N_T}]^T \quad \text{[Formula 2]}$$

Meanwhile, transmission powers can be set different from each other for transmission informations $s_1, s_2, \ldots, s_{N_T}$, respectively. If the transmission powers are set to $P_1, P_2, \ldots, P_{N_T}$, respectively, the transmission power adjusted transmission information can be represented as Formula 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Formula 3]}$$

And, $\hat{S}$ may be represented as Formula 4 using a diagonal matrix P of the transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Formula 4]}$$

Let us consider a case of configuring $N_T$ transmitted signals $x_1, x_2, \ldots, x_{N_T}$, which are actually transmitted, by applying a weight matrix W to a transmission power adjusted information vector $\hat{S}$. In this case, the weight matrix plays a role in properly distributing each transmission information to each antenna according to a transmission channel status and the like. The transmitted signals are set to $x_1, x_2, \ldots, x_{N_T}$, may be represented as Formula 5 using a vector X. In this case, $W_{ij}$ means a weight between an $i^{th}$ transmitting antenna and a $j^{th}$ information. And, the W may be called a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \quad \text{[Formula 5]}$$

$$W\hat{s} = WPs$$

Generally, a physical meaning of a rank of a channel matrix may indicate a maximum number for carrying different informations on a granted channel. Since a rank of a channel matrix is defined as a minimum number of the numbers of independent rows or columns, a rank of a channel is not greater than the number of rows or columns. For example by formula, a rank of a channel H (i.e., rank (H)) is limited by Formula 6.

$$\text{rank}(H) \leq \min(N_T, N_R) \quad \text{[Formula 6]}$$

Meanwhile, each different information sent by MIMO technology may be defined as 'transport stream' or 'stream' simply. This 'stream' may be called a layer. If so, the number of transport streams is unable to be greater than a channel rank, which is the maximum number for sending different informations. Hence, the channel matrix 14 may be represented as Formula 7.

$$\text{\# of streams} \leq \text{rank}(H) \leq \min(N_T, N_R) \quad \text{[Formula 7]}$$

In this case, '# of streams' may indicate the number of streams. Meanwhile, it should be noted that one stream is transmittable via at least one antenna.

Various methods for making at least one stream correspond to several antennas may exist. These methods may be described in accordance with a type of MIMO technique as follows. First of all, if one stream is transmitted via several antennas, it may be regarded as spatial diversity. If several streams are transmitted via several antennas, it may be regarded as spatial multiplexing. Of course, such an intermediate type between spatial diversity and spatial multiplexing as a hybrid type of spatial diversity and spatial multiplexing may be possible.

Meanwhile, it is expected that LTE-A system, which is the standard of a next generation mobile communication system, will support CoMP (coordinated multi point) transmission scheme unsupported by the previous standard in order to enhance a data transmission rate. In this case, the CoMP transmission scheme means a transmission scheme for enabling at least two base stations or cells to coordinately communicate with a user equipment to enhance communication performance between a base station (cell or sector) and a user equipment located in a radio shadow area.

The CoMP transmission scheme may be categorized into CoMP-JP (CoMP-Joint Processing) of a coordinated MIMO type through data sharing and CoMP-CS/CB (CoMP Coordinated Scheduling/Coordinated Beamforming).

In CoMP-JP for a case of a downlink, a user equipment can receive data from base stations, each of which performs the CoMP transmission, simultaneously and instantly and is then able to enhance reception performance by combining the signals received from the base stations together [Joint Transmission (JT)]. And, it is able to consider a method for one of the base stations, each of which performs the CoMP transmission, to transmit data to the user equipment at a specific timing point [Dynamic Pont Selection (DPS)].

On the other hand, in CoMP-CS/CB (CoMP Coordinated Scheduling/Coordinated Beamforming), a user equipment can instantly receive data from a single base station, and more particularly, from a serving base station by beamforming.

In CoMP-JP (CoMP-Joint Processing) for a case of an uplink, each base station can receive a PUSCH signal from a user equipment simultaneously [Joint Reception (JR)]. On the other hand, in CoMP-CS/CB (CoMP Coordinated Scheduling/Coordinated Beamforming), a single base station receives PUSCH only. In doing so, determination for using the CoMP-CS/CB (CoMP Coordinated Scheduling/Coordinated Beamforming) is made by coordinated cells (or base stations).

In the following description, channel station information (CSI) reporting is explained. First of all, two kinds of transmission schemes (i.e., open-loop MIMO operational without channel state information and closed-loop MIMO operational based on channel state information) exist in the current LTE standard. Especially, in the closed-loop MIMO, each of a user equipment and a base station can perform beamforming based on channel state information in order to obtain a multiplexing gain of MIMO antenna. In order to obtain the channel state information from the user equipment, the base station sends a reference signal to the user equipment and commands the user equipment to feed channel station information measured based on the reference signal back to the base station via PUCCH (physical uplink control channel) or PUSCH (physical uplink shared channel).

CSI can be mainly classified into three kinds of informations including RI (rank indicator), PMI (precoding matrix index) and CQI (channel quality indication). First of all, as mentioned in the foregoing description, the RI indicates rank information of a channel and means the number streams a user equipment can receive via the same frequency-time resource. Since the RI is determined by long term fading, it is fed back to a base station by periods longer than those of the PMI or CQI in general.

Secondly, the PMI is the value reflecting spatial property of a channel and indicates a precoding matrix index of a base station preferred by a user equipment with reference to such a metric as SINR and the like. Finally, the CQI is a value indicating a strength of a channel and means a reception SINR normally obtainable when a base station uses PMI.

In such an advanced communication system such as the LTE-A standard, additional multi-user diversity can be additionally obtained using MU-MIMO (multi-user MIMO). Since interference between user equipments multiplexed together in antenna domain exists in MU-MIMO, a presence or non-presence of accuracy of CSI may considerably affect not only interference of a user equipment having reported the CSI but also interference of another multiplexed user equipment. Therefore, the MU-MINO requires a CSI reporting more accurate than that of SU-MIMO.

Hence, according to LTE-A standard, a final PMI is determined as designed in a manner of being divided into W1 and W2. In this case, the W1 is a long-term and/or wideband PMI and the W2 is a short-term and/or subband PMI.

For example of a hierarchical codebook transformation method of configuring one final PMI from the W1 and W2 informations, it is able to use a long-term covariance matrix of a channel, as shown in Formula 8.

$$W = \text{norm}(W1\,W2) \qquad \text{[Formula 8]}$$

In Formula 8, the W2 is a short-term PMI and indicates a codeword of a codebook configured to reflect short-term channel information, the W indicates a codeword of a final codebook, and the norm(A) means a matrix in which a norm of each column of a matrix A is normalized into 1.

The existing structures of W1 and W2 can be expressed as Formula 9.

$$W1(i) = \begin{bmatrix} X_i & 0 \\ 0 & X_i \end{bmatrix}, \text{ where } X_i \text{ is } Nt/2 \text{ by } M \text{ matrix.} \qquad \text{[Formula 9]}$$

$$W2(j) = \overbrace{\begin{bmatrix} e_M^k & e_M^l & & e_M^m \\ & & \cdots & \\ \alpha_j e_M^k & \beta_j e_M^l & & \gamma_j e_M^m \end{bmatrix}}^{r \text{ columns}} \text{ (if rank} = r),$$

where $l \leq k, l, m \leq M$ and $k, l, m$ are integer.

In Formula 9, the codeword structure uses cross polarized antenna. This structure is designed by reflecting channel correlation characteristics occurring if an inter-antenna space is very narrow (i.e., if a distance between neighboring antennas is equal to or smaller than a half of a signal wavelength). In case of the cross polarized antenna, antennas can be grouped into a horizontal antenna group and a vertical antenna group. Each of the antenna groups has the property of ULA (uniform linear array) antenna and the two antenna groups coexist.

Hence, inter-antenna correlation of each of the groups has the same property of linear phase increment, while inter-antenna group correlation has the property of phase rotation. Eventually, since a codebook presents a value of quantizing a channel, it is necessary to design the codebook by reflecting channel characteristics intact. For clarity of the following description, one example of Rank-1 codeword configured in the above-described hierarchy can be represented as Formula 10.

$$W1(i) * W2(j) = \begin{bmatrix} X_i(k) \\ \alpha_j X_i(k) \end{bmatrix} \qquad \text{[Formula 10]}$$

In Formula 10, the codeword can be expressed as $N_T \times 1$ vectors and is hierachized into an upper vector $X_i(k)$ and a lower vector $a_j X_i(k)$. In this case, the NT indicates the number of transmitting antennas. And, the upper vector and the lower vector show the correlation property of the horizontal antenna group and the correlation property of the vertical antenna group, respectively. It is advantageous if the $X_i(k)$ is represented as a vector having the property of linear phase increment by reflecting the inter-antenna correlation property of each antenna group. For representative example, DFT matrix can be used as the $X_i(k)$.

In such an advanced communication system such as the LTE-A standard, additional multi-user diversity can be additionally obtained using MU-MIMO (multi-user MIMO). Since interference between user equipments multiplexed together in antenna domain exists in MU-MIMO, a presence or non-presence of accuracy of CSI may considerably affect not only interference of a user equipment having reported the CSI but also interference of another multiplexed user equipment. Therefore, the MU-MINO requires a CSI reporting more accurate than that of SU-MIMO.

Moreover, in case of CoMP JT, since several base stations coordinately sends the same data to a specific user equipment, a corresponding system can be theoretically regarded as an MIMO system in which antennas are geographically distributed. In particular, when MU-MIMO is operated in JT, channel state information of high accuracy is required to avoid interference between coordinately scheduled user equipments like the case of a single cell MU-MIMO. In case of CoMP CB, an elaborate channel state information is also required to avoid interference given to a serving cell by a neighbor cell. In order to increase accuracy of channel state information feedback in general, an additional channel state information feedback reporting is required and such reporting is transmitted to a base station on PUCCH or PUSCH.

In the following description, reference signals are explained in detail.

First of all, a reference signal already known to both a transmitting side and a receiving side is generally transmitted for channel measurement to the receiving side from the transmitting side together with data. This reference signal is provided for the channel measurement and also indicates a modulation scheme to play a role in enabling a demodulation process. Reference signals can be categorized into a dedicated reference signal (DRS) for a specific user equipment (UE) and a dedicated reference signal for a base station, i.e., a UE-specific reference signal and a common reference signal (common RS or CRS (cell-specific RS) that is a cell-specific reference signal for all user equipments within a cell. Moreover, the cell-specific reference signal includes a reference signal for measuring and reporting CQI/PMI/RI to a base station from a user equipment. And, such a reference signal is called CSI-RS (channel state information-RS).

Figure 8:
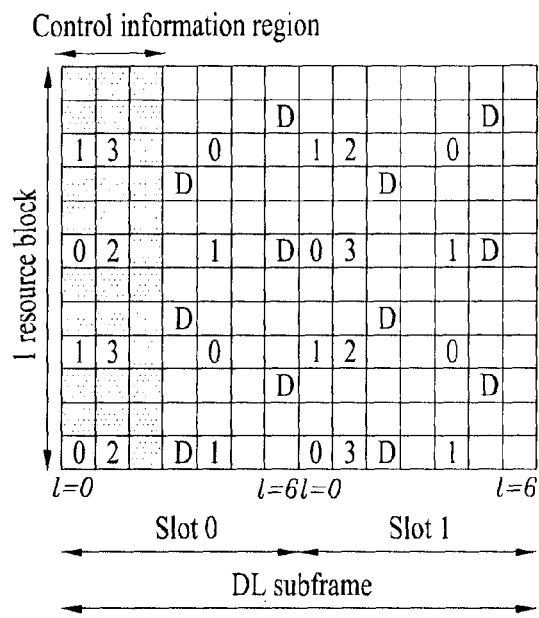
FIG. 8 and FIG. 9 are diagrams for structures of a downlink reference signal in LTE system supportive of a downlink transmission using 4 antennas.
Figure 9:
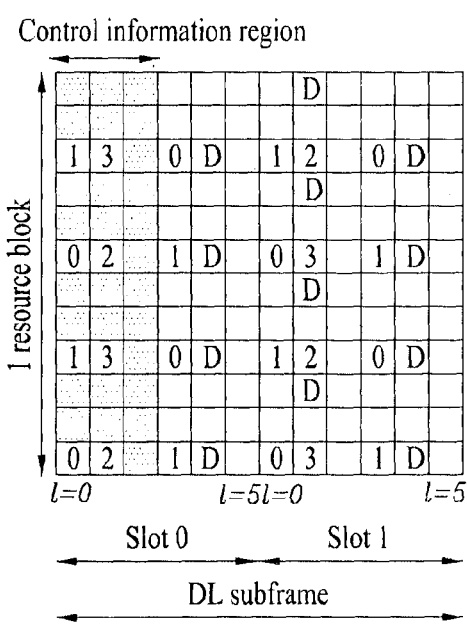

FIG. 8 and FIG. 9 are diagrams for structures of a downlink reference signal in LTE system supportive of a downlink transmission using 4 antennas. Particularly, FIG. 8 shows a case of a normal cyclic prefix and FIG. 9 shows a case of an extended cyclic prefix.

Referring to FIG. 8 and FIG. 9, numerals 0 to 3 entered in a grid correspond to ports 0 to 3 and mean common reference signals (CRS) that are cell-specific reference signals transmitted for channel measurement and data demodulation, respectively. The cell-specific reference signals, CRS, can be transmitted to a user equipment across a control information region and a data information region.

'D' entered in the grid means a downlink DM-RS (de-modulation-RS) that is a UE-specific RS. The DM-RS supports a single antenna port transmission on PDSCH. A user equipment receives a signaling of a presence or non-presence of DMRS, which is a UE-specific RS, through an upper layer. FIG. 8 and FIG. 9 show examples of DM-RS corresponding to an antenna port 5. In 3GPP standard document 36.211, DM-RSs for antenna ports 7 to 14, i.e., total 8 antenna ports, are defined as well.

Figure 10:
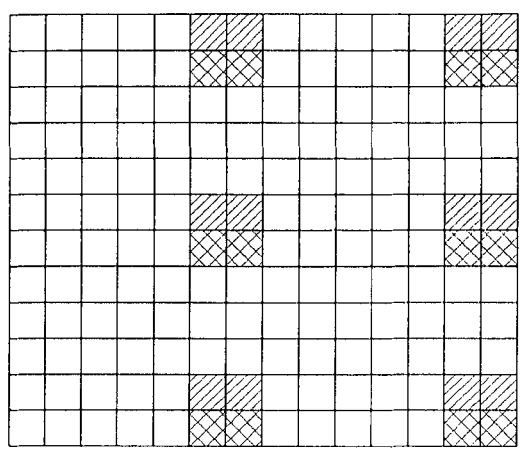
FIG. 10 is a diagram for one example of downlink DM-RS assignment currently defined in 3GPP standard document.
Figure 11:
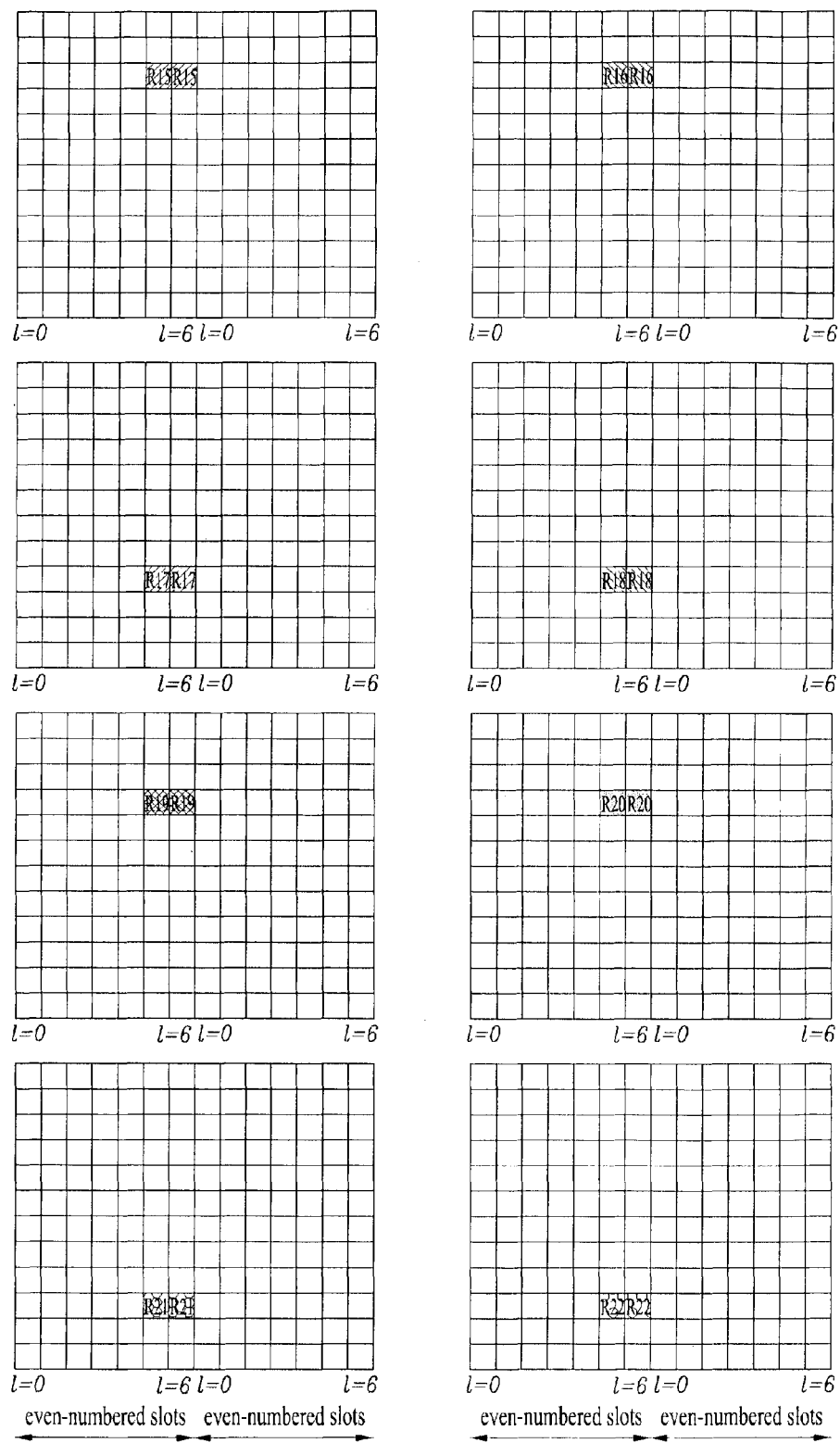
FIG. 11 is a diagram for one example of CSI-RS configuration #0 in case of a normal CP in the downlink CSI-RS configuration currently defined in 3GPP standard document.

FIG. 10 is a diagram for one example of downlink DM-RS assignment currently defined in 3GPP standard document.

Referring to FIG. 10, DM-RS corresponding to antenna port {7, 8, 11, 13} in DM-RS Group 1 is mapped using a sequence per antenna port. Likewise, DM-RS corresponding to antenna port {9, 10, 12, 14} in DM-RS Group 2 are mapped using a sequence per antenna port.

Aside from CRS, the above-mentioned CSI-RS is proposed for the purpose of channel measurement of PDSCH. Unlike CRS, CSI-RSs can be defined into maximum 32 kinds of different CSI-RS configurations in order to reduce inter-cell interference (ICI) in a multi-cell environment.

CSI-RS configurations differ from each other depending on the number of antenna ports. Between neighboring cells, CSI-RS is configured to be transmitted in a manner of being defined to have a CSI-RS configuration as different as possible. Unlike CRS, CSI-RS supports maximum 8 antenna ports. In 3GPP standard document, total 8 antenna ports including antenna ports 15 to 22 are assigned as antenna ports for CSI-RS. In the following, Table 1 and Table 2 show CSI-RS configurations defined in 3GPP standard document. Particularly, Table 1 show a case of a normal CP and Table 2 show a case of an extended CP.

TABLE 1

| CSI reference signal configuration | Number of CSI reference signals configured | | | | | |
|---|---|---|---|---|---|---|
| | 1 or 2 | | 4 | | 8 | |
| | (k',l') | $n_s$ mod 2 | (k',l') | $n_s$ mod 2 | (k',l') | $n_s$ mod 2 |
| Frame strucure type 1 and 2 | | | | | | |
| 0 | (9,5) | 0 | (9,5) | 0 | (9,5) | 0 |
| 1 | (11,2) | 1 | (11,2) | 1 | (11,2) | 1 |
| 2 | (9,2) | 1 | (9,2) | 1 | (9,2) | 1 |
| 3 | (7,2) | 1 | (7,2) | 1 | (7,2) | 1 |
| 4 | (9,5) | 1 | (9,5) | 1 | (9,5) | 1 |
| 5 | (8,5) | 0 | (8,5) | 0 | | |
| 6 | (10,2) | 1 | (10,2) | 1 | | |
| 7 | (8,2) | 1 | (8,2) | 1 | | |
| 8 | (6,2) | 1 | (6,2) | 1 | | |
| 9 | (8,5) | 1 | (8,5) | 1 | | |
| 10 | (3,5) | 0 | | | | |
| 11 | (2,5) | 0 | | | | |
| 12 | (5,2) | 1 | | | | |
| 13 | (4,2) | 1 | | | | |
| 14 | (3,2) | 1 | | | | |
| 15 | (2,2) | 1 | | | | |
| 16 | (1,2) | 1 | | | | |
| 17 | (0,2) | 1 | | | | |
| 18 | (3,5) | 1 | | | | |
| 19 | (2,5) | 1 | | | | |
| Frame structure type 2 only | | | | | | |
| 20 | (11,1) | 1 | (11,1) | 1 | (11,1) | 1 |
| 21 | (9,1) | 1 | (9,1) | 1 | (9,1) | 1 |
| 22 | (7,1) | 1 | (7,1) | 1 | (7,1) | 1 |
| 23 | (10,1) | 1 | (10,1) | 1 | | |
| 24 | (8,1) | 1 | (8,1) | 1 | | |
| 25 | (6,1) | 1 | (6,1) | 1 | | |
| 26 | (5,1) | 1 | | | | |
| 27 | (4,1) | 1 | | | | |
| 28 | (3,1) | 1 | | | | |
| 29 | (2,1) | 1 | | | | |
| 30 | (1,1) | 1 | | | | |
| 31 | (0,1) | 1 | | | | |

TABLE 2

| CSI reference signal configuration | Number of CSI reference signals configured | | | | | |
|---|---|---|---|---|---|---|
| | 1 or 2 | | 4 | | 8 | |
| | (k',l') | $n_s$ mod 2 | (k',l') | $n_s$ mod 2 | (k',l') | $n_s$ mod 2 |
| Frame strucure type 1 and 2 | | | | | | |
| 0 | (11,4) | 0 | (11,4) | 0 | (11,4) | 0 |
| 1 | (9,4) | 0 | (9,4) | 0 | (9,4) | 0 |
| 2 | (10,4) | 1 | (10,4) | 1 | (10,4) | 1 |
| 3 | (9,4) | 1 | (9,4) | 1 | (9,4) | 1 |
| 4 | (5,4) | 0 | (5,4) | 0 | | |
| 5 | (3,4) | 0 | (3,4) | 0 | | |
| 6 | (4,4) | 1 | (4,4) | 1 | | |

TABLE 2-continued

| CSI reference signal configuration | Number of CSI reference signals configured | | | | | |
|---|---|---|---|---|---|---|
| | 1 or 2 | | 4 | | 8 | |
| | (k',l') | $n_s$ mod 2 | (k',l') | $n_s$ mod 2 | (k',l') | $n_s$ mod 2 |
| 7 | (3,4) | 1 | (3,4) | 1 | | |
| 8 | (8,4) | 0 | | | | |
| 9 | (6,4) | 0 | | | | |
| 10 | (2,4) | 0 | | | | |
| 11 | (0,4) | 0 | | | | |
| 12 | (7,4) | 1 | | | | |
| 13 | (6,4) | 1 | | | | |
| 14 | (1,4) | 1 | | | | |
| 15 | (0,4) | 1 | | | | |
| Frame structure type 2 only | | | | | | |
| 16 | (11,1) | 1 | (11,1) | 1 | (11,1) | 1 |
| 17 | (10,1) | 1 | (10,1) | 1 | (10,1) | 1 |
| 18 | (9,1) | 1 | (9,1) | 1 | (9,1) | 1 |
| 19 | (5,1) | 1 | (5,1) | 1 | | |
| 20 | (4,1) | 1 | (4,1) | 1 | | |
| 21 | (3,1) | 1 | (3,1) | 1 | | |
| 22 | (8,1) | 1 | | | | |
| 23 | (7,1) | 1 | | | | |
| 24 | (6,1) | 1 | | | | |
| 25 | (2,1) | 1 | | | | |
| 26 | (1,1) | 1 | | | | |
| 27 | (0,1) | 1 | | | | |

In Table 1 and Table 2, (k', l') indicates an RE index, k' indicates a subcarrier index, and l' indicates an OFDM symbol index. FIG. 10 is a diagram for one example of CSI-RS configuration #0 in case of a normal CP in the downlink CSI-RS configuration currently defined in 3GPP standard document.

Moreover, CSI-RS subframe configuration can be defined, which is configured with a periodicity $T_{CSI-RS}$ represented by subframe unit and a subframe offset $\Delta_{CSI-RS}$. Table 3 in the following shows CSI-RS subframe configuration defined in 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ - 5 |
| 15-34 | 20 | $I_{CSI-RS}$ - 15 |
| 35-74 | 40 | $I_{CSI-RS}$ - 35 |
| 75-154 | 80 | $I_{CSI-RS}$ - 75 |

Currently, information on ZP (zero-power) CSI-RS is transmitted in the format shown in Table 4 via RRC layer signal in a manner of being included in CSI-RS-Config-r10 message. In particular, ZP CSI-RS resource configuration is configured with zeroTxPowerSubframeConfig-r10 and zeroTxPowerResourceConfigList-r10 that is a 16-bit bitmap. In this case, the zeroTxPowerSubframeConfig-r10 indicates periodicity and subframe offset for transmitting the corresponding ZP CST-RS through ICSI-RS value corresponding to Table 3. Moreover, the zeroTxPowerResource-ConfigList-r10 is the information indicating ZP CSI-RS configuration. And, the elements of the bitmap indicate the settings included in the column having 4 antenna ports for CSI-RS shown in Table 1 or Table 2. In particular, according to the current 3GPP standard document, the ZP CSI-RS is defined only if there are 4 antenna ports for CSI-RS.

TABLE 4

```
-- ASN1START
CSI-RS-Config-r10 ::=        SEQUENCE {
   csi-RS-r10                CHOICE {
      ...
   }
   zeroTxPowerCSI-RS-r10     CHOICE {
      release                NULL,
      setup                  SEQUENCE {
         zeroTxPowerResourceConfigList-r10   BIT STRING
                                             (SIZE(16)),
         zeroTxPowerSubframeConfig-r10       INTEGER
                                             (0..154)
      }
   }
}
-- ASN1STOP
```

For reference, according to the current 3GPP standard document, CQI index, a corresponding modulation order, a corresponding coding rate and the like can be represented as Table 5.

TABLE 5

| CQI index | modulation | code rate × 1024 | efficiency |
|---|---|---|---|
| 0 | | out of range | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

Meanwhile, an operation for CQI calculation through interference measurement can be described as follows.

First of all, a user equipment needs to calculate SINR as a factor necessary for CQI calculation. In this case, the user equipment can perform a reception power measurement (S-measure) of a desired signal using such RS as NZP CSI-RS and the like. And, the user equipment measures a power of an interference signal resulting from removing the desired signal from the received signal for an interference power measurement (I-measure or IM (interference measurement)).

Subframe sets CCSI,0 and CCSI,1 for CSI measurement can be configured by upper layer signaling. And, subframes corresponding to each of the subframe sets are included in one set only without overlapping each other. In this case, the user equipment (UE) can perform the S-measure through such RS as CSI-RS and the like without particular subframe restrictions. Yet, in case of the I-measure, the user equipment should perform two kinds of different CQI calculations on the CCSI,0 and the CCSI,1 by separately performing the I-measure on each of the CCSI,0 and CCSI,1, respectively.

In the following description, an active antenna system (AAS) and a 3-dimensional (3D) beamforming are explained.

First of all, in an existing cellular system, a base station reduces inter-cell interference and enhances throughput (e.g., SINR (signal to interference plus noise ratio)) of user equipments in a cell, using a mechanical tilting or an electrical tilting. This is described in detail with reference to the accompanying drawings as follows.

Figure 12:
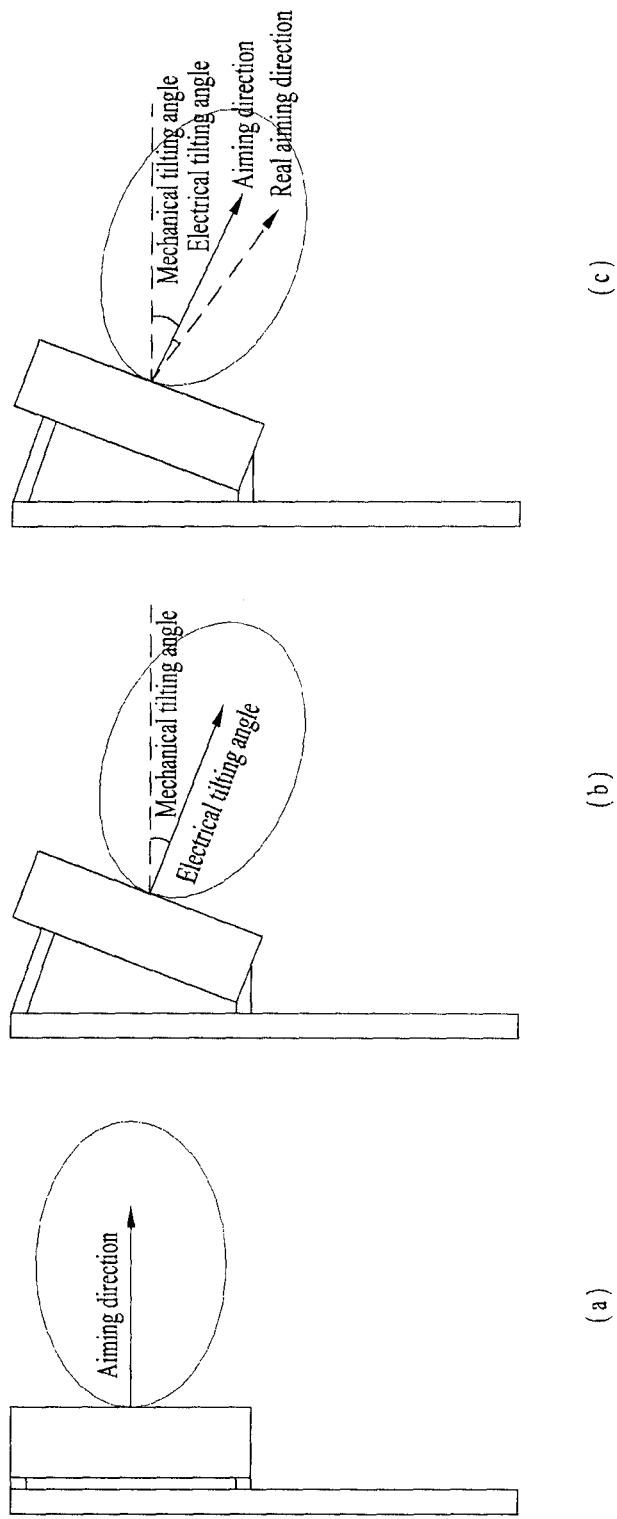
FIG. 12 is a diagram to describe an antenna tilting system.

FIG. 12 is a diagram to describe an antenna tilting system. Particularly, FIG. 12 (a) shows an antenna structure to which an antenna tilting is not applied. FIG. 12 (b) shows an antenna structure to which a mechanical tilting is applied. And, FIG. 12 (c) shows an antenna structure to which both a mechanical tilting and an electrical tilting are applied.

Comparing FIG. 12 (a) and FIG. 12 (b) to each other, regarding a mechanical tilting, as shown in FIG. 12 (b), it is disadvantageous in that a beam direction is fixed in case of an initial installation. Moreover, regarding an electrical tilting, as shown in FIG. 12 (c), despite that a tilting angle is changeable using an internal phase shift module, it is disadvantageous in that a very restrictive vertical beamforming is available only due to a substantially cell-fixed tilting.

Figure 13:
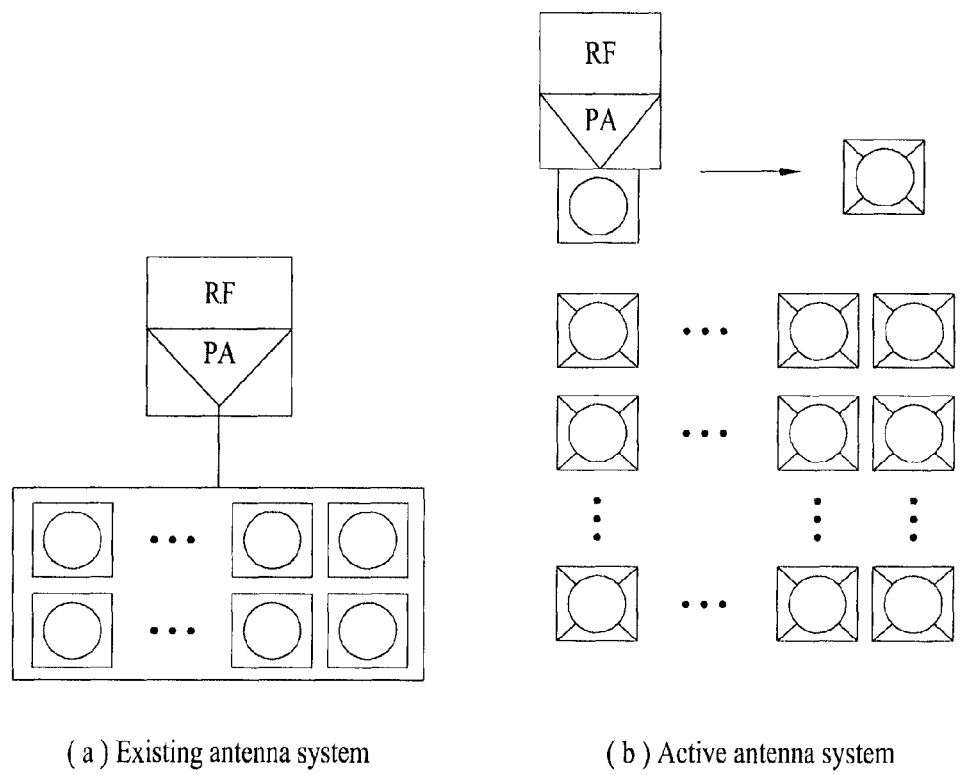
FIG. 13 is a diagram for one example of comparing an existing antenna system and an active antenna system to each other.

FIG. 13 is a diagram for one example of comparing an existing antenna system and an active antenna system to each other. Particularly, FIG. 13 (a) shows an existing antenna system, while FIG. 13 (b) shows an active antenna system.

Referring to FIG. 13, in an active antenna system, unlike an existing antenna system, each of a plurality of antenna modules includes active devices such as a power amplifier, an RF module and the like. Hence, the active antenna system is capable of controlling/adjusting a power and phase for each of the antenna modules.

In a generally considered MIMO antenna structure, a linear antenna (i.e., 1-dimensional array antenna) like a ULA (uniform linear array) antenna is taken into consideration. In this 1-dimensional array structure, a beam generable by beamforming exists in a 2-dimensonal plane. This applies to a PAS (passive antenna system) based MIMO structure of an existing base station. Although vertical antennas and horizontal antennas exist in the PAS based base station, since the vertical antennas are combined into one RF module, beamforming in vertical direction is impossible but the above-mentioned mechanical tilting is applicable only.

Yet, as an antenna structure of a base station evolves into AAS, an independent RF module is implemented for each antenna in a vertical direction, whereby a beamforming in a vertical direction is possible as well as in a horizontal direction. Such a beamforming is called an elevation beamforming.

According to the elevation beamforming, generable beams can be represented in a 3-dimensional space in vertical and horizontal directions. Hence, such a beamforming can be named a 3-dimensional (3D) beamforming. In particular, the 3D beamforming is possible because the 1D array antenna structure is evolved into a 2D array antenna structure in a plane shape. In this case, the 3D beamforming is possible in a 3D array structure of a ring shape as well as in a planar-shaped antenna array structure. The 3D beamforming is characterized in that an MIMO process is performed in a 3D space owing to antenna deployments of various types instead of an existing 1D array antenna structure.

Figure 14:
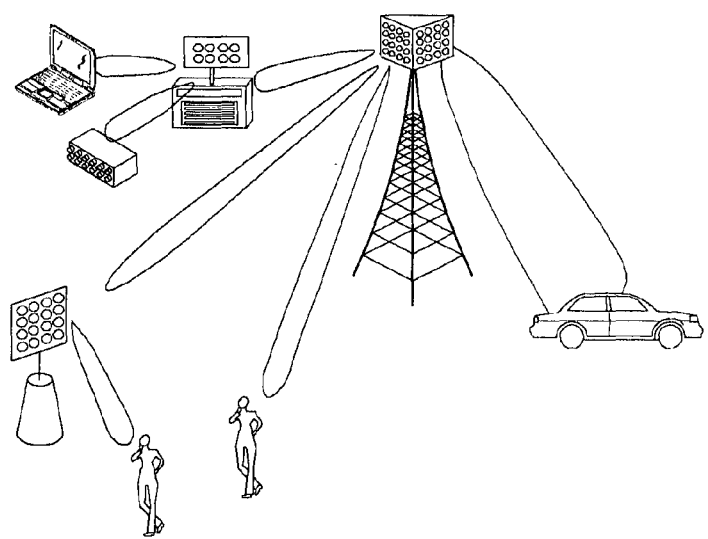
FIG. 14 is a diagram for one example of forming a UE-specific beam based on an active antenna system.

FIG. 14 is a diagram for one example of forming a UE-specific beam based on an active antenna system.

Referring to FIG. 14, owing to the 3D beamforming, a beamforming is possible in case that a user equipment moves back and forth as well as in case that the user equipment moves right and left to the base station. Hence, it can be observed that a higher degree of freedom is provided to a UE-specific beamforming.

Moreover, as a transmission environment using an active antenna based 2D array antenna structure, an environment (O2I: outdoor to indoor) of a transmission from an outdoor base station to an indoor user equipment, an environment (indoor hotspot) of a transmission from an indoor base station to an indoor user equipment or the like can be considered as well as an environment of a transmission from an outdoor base station to an outdoor user equipment.

Figure 15:
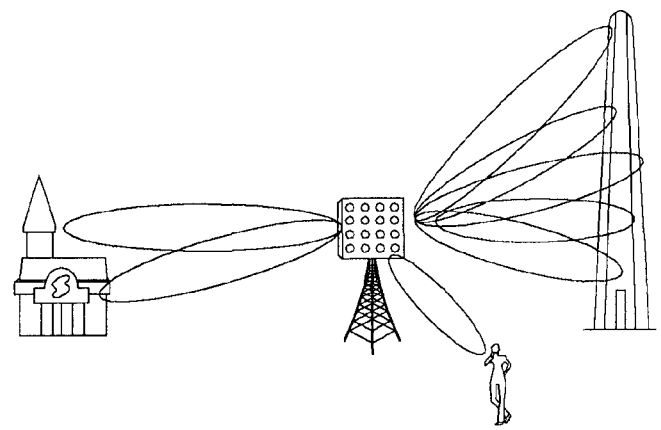
FIG. 15 is a diagram of a 2-dimensional beam transmission scenario based on an active antenna system.

FIG. 15 is a diagram of a 2-dimensional (2D) beam transmission scenario based on an active antenna system.

Referring to FIG. 15, assuming a real cell environment in which a plurality of various buildings exist within a cell, a base station needs to consider a vertical beam steering capability in consideration of various user equipment heights in accordance with a building height as well as a UE-specific horizontal beam steering capability. Considering such a cell environment, it is necessary to reflect channel characteristics (e.g., radio shadow/path loss variation due to a height difference, fading characteristic change, etc.) considerably different from an existing radio channel environment.

So to speak, a 3D beamforming, which is evolved from a horizontal beamforming performed in a horizontal direction only based on an antenna structure of an existing linear 1D array, indicates an MIMO processing scheme performed in a manner of being extended to and combined with an elevation beamforming or a vertical beamforming based on an antenna structure of multi-dimensional arrays including a planar array and the like.

Meanwhile, a CoMP scheme of a related art is defined based on a horizontal beamforming. This is described in detail with reference to the accompanying drawing as follows.

Figure 16:
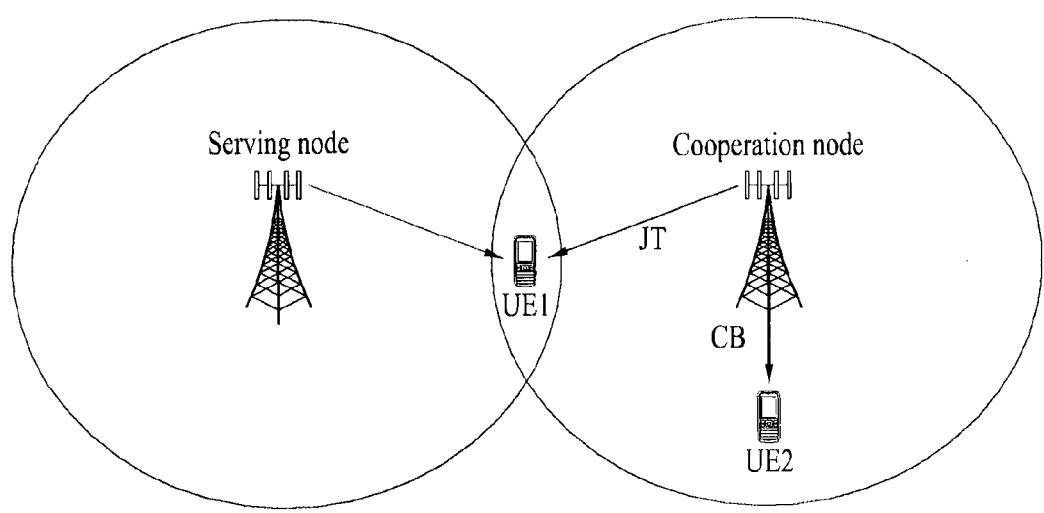
FIG. 16 is a diagram for one example of an existing CoMP operation based on a horizontal beamforming.

FIG. 16 is a diagram for one example of an existing CoMP operation based on a horizontal beamforming.

Referring to FIG. 16, for example of an operation, a serving node (or a serving point) and a cooperation node (or a cooperation point) cooperatively transmit signals to a UE #1 in a common coverage of the two nodes by JT (joint transmission) scheme or the cooperation node may perform a CB (coordination beamforming) scheme in a direction of avoiding interference on a transmission to the UE #1 from the serving node as far as possible. In addition, the cooperation mode may perform a DPS (dynamic point selection) scheme or the like. These schemes are basically based on a horizontal beamforming performed in a horizontal direction only using an antenna structure of ID array.

As a 3D beamforming will be available in the future, an elevation beamforming based CoMP operation will be available as well. This is described with reference to the accompanying drawings as follows.

Figure 17:
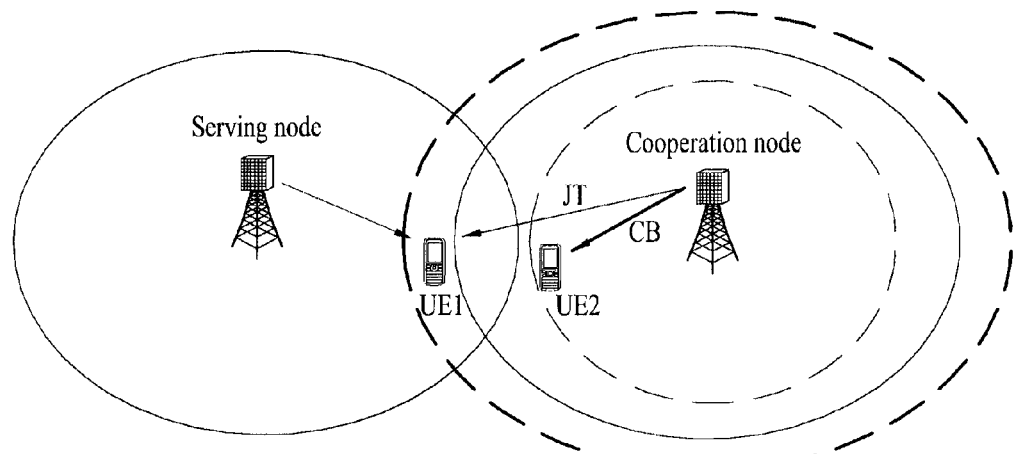
FIG. 17 and FIG. 18 are diagrams for examples of an elevation beam forming based CoMP operation.
Figure 18:
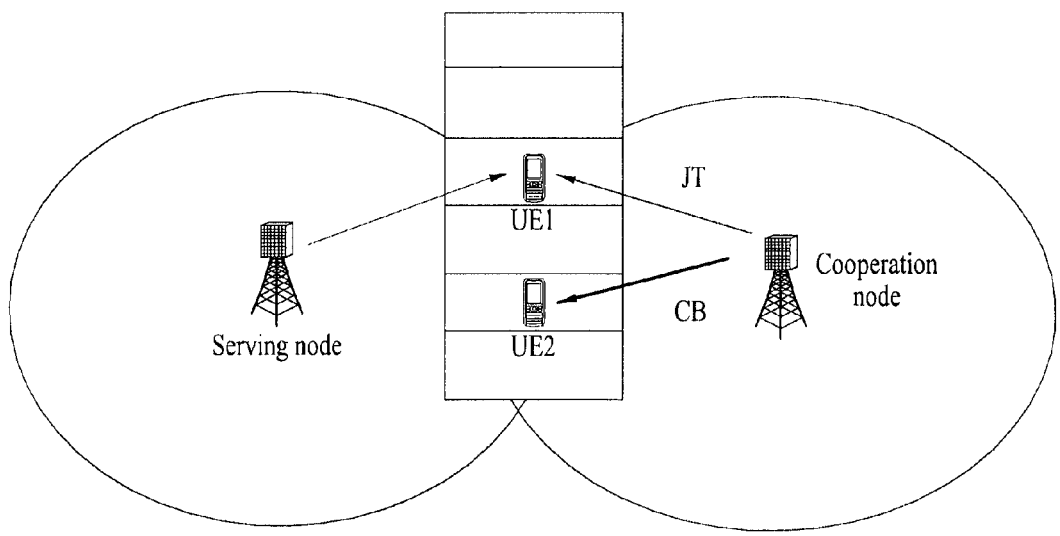

FIG. 17 and FIG. 18 are diagrams for examples of an elevation beam forming based CoMP operation. Particularly, FIG. 17 shows a cooperation point transmission coverage control method and FIG. 18 shows a cooperation point transmission height control method.

In particular, an elevation beamforming based CoMP operation is performed by the cooperation point transmission coverage control method shown in FIG. 17 or the cooperation point transmission height control method shown in FIG. 18.

In case of applying the cooperation point transmission coverage control method shown in FIG. 17, it is able to extend a transmission range by increasing an elevation angle for the JT scheme or the transmission range can be reduced by decreasing the elevation angle for the CB scheme. In case of applying the cooperation point transmission height control method shown in FIG. 18, an elevation angle is set to face the same height of a serving node for the JT scheme or the elevation angle can be set to a height different from a transmission height of the serving node as far as possible for the CB scheme.

An elevation beamforming based CoMP operation differs from an existing horizontal beamforming based CoMP operation in that a range of an angle of an elevation beam to be used for each of the JT scheme and the CB scheme can be fixed from the beginning of a cell establishment depending on a cell environment for each transmission node.

Figure 19:
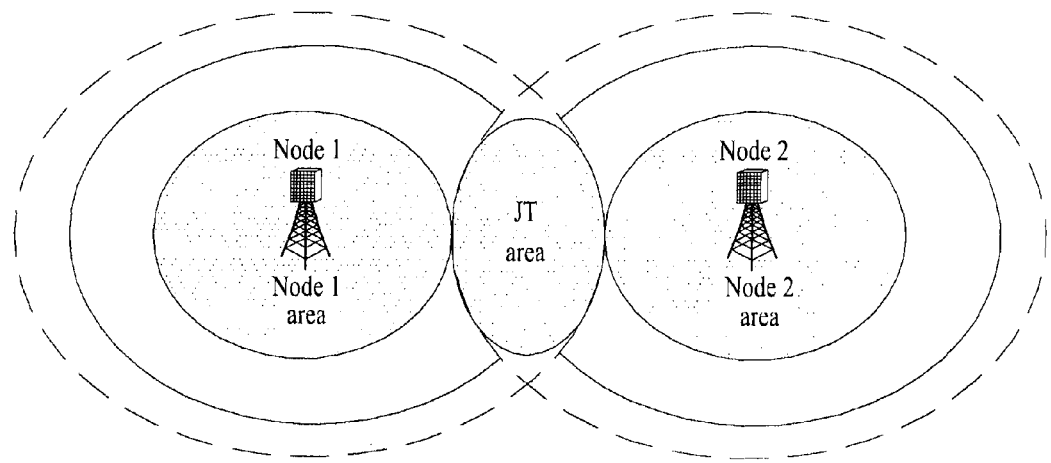
FIG. 19 is a diagram for one example of an elevation beam forming based CoMP operation of a cooperation point transmission range control system according to an embodiment of the present invention.

FIG. 19 is a diagram for one example of an elevation beam forming based CoMP operation of a cooperation point (node) transmission range control system according to an embodiment of the present invention.

Referring to FIG. 19, in case of applying a cooperation point (node) transmission coverage control method, an elevation beamforming angle for the JT scheme always become a value equal to or greater than a prescribed value and an elevation beamforming angle for the CB scheme always become a value equal to or smaller than a prescribed value.

Moreover, in case of applying a cooperation point transmission height control method, an elevation beam angle range difference can exist due to differences of configuration and size of antenna array between the two nodes (or points) and/or differences of location and altitude between the two nodes (or points).

Figure 20:
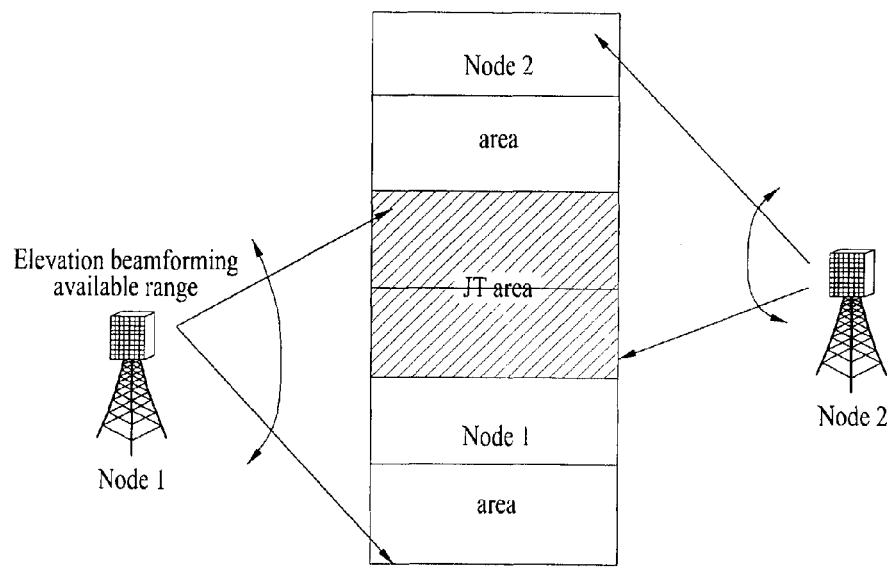
FIG. 20 is a diagram for one example of an elevation beam forming based CoMP operation of a cooperation point transmission height control system according to an embodiment of the present invention.

FIG. 20 is a diagram for one example of an elevation beam forming based CoMP operation of a cooperation point (node) transmission height control system according to an embodiment of the present invention.

Referring to FIG. 20, it can be observed that a range of an elevation beamforming angle available for the JT scheme is different from a range of an elevation beamforming angle available for the CB scheme.

According to the above discussions, if a user equipment is able to know what kind of transmission is possible at a prescribed elevation beamforming angle, a feedback optimized for a corresponding transmission mode is possible.

1st Embodiment

For the above-mentioned optimized feedback, according to a 1st embodiment of the present invention, a base station informs a user equipment of a transmission mode available in accordance with a range of an elevation beamforming angle and/or a feedback configuration information of the user equipment. In this case, the feedback configuration information of the user equipment means a set of informations that will be or can be delivered to the base station by the user equipment.

Having received the above-mentioned information, the user equipment is proposed to feed back at least one of informations shown in Table 6 to the base station using the transmission mode available in accordance with the range of the elevation beamforming angle and/or the feedback configuration information of the user equipment.

TABLE 6

Available or preferred transmission mode (e.g., JT available or preferred, specific transmission mode available or preferred)
CSI calculated and/or configured based on an available or preferred transmission mode
Range of an available or preferred elevation beamforming angle or angle
CSI calculated and/or configured based on an available or preferred elevation beamforming angle The transmission mode means a transmission technology or a set of transmission technologies. The transmission mode may coincide with TM (transmission mode) defined in LTE system, by which the transmission mode may be non-limited. For instance, since TM10 defined in LTE system can support various CoMP transmission schemes, a transmission mode of the present invention can be defined in a manner of subdividing CoMP transmission schemes. In particular, under the TM10, transmission modes can be subdivided per CoMP transmission scheme like 'TM 1=JT', 'TM 2=CB', 'TM 3=DPS', etc.

Moreover, the beamforming angle can be represented as a beamforming angle itself or a quantized value. Alternatively, the beamforming angle may be represented in a following manner. First of all, MIMO precoder candidates are defined as a codebook in advance like LTE system. Secondly, the beamforming angle is represented as an index of the codebook. Meanwhile, in case that the number of controllable beamforming angles is small, a rage of the beamforming angle can be replaced by the beamforming angle.

Furthermore, information on a UE-preferred beamforming angle or information on an MIMO precoder can be included in the CSI information shown in Table 6. And, this information may be configured with at least one combination of the informations shown in Table 7.

TABLE 7

Preferred elevation beamforming angle or PMI preferred in a vertical PMI codebook
Preferred horizontal beamforming angle or PMI preferred in a horizontal PMI codebook
Preferred 3D beamforming angle or PMI preferred in a 3D PMI codebook The vertical PMI codebook, the horizontal PMI codebook and the 3D PMI codebook may be defined as different PMI codebooks, respectively but can be discriminated from each other in a manner of differentiating a range of a used PMT or a codebook creation parameter based on the same codebook. For instance, in LTE system, codebooks can be defined in a following manner. First of all, a horizontal PMI codebook uses an existing PMI codebook. Secondly, a vertical PMI codebook uses the same PMI codebook of the horizontal PMI codebook but puts restriction on the number of available PMI candidates through a codebook subset restriction scheme.

In the following description, one example of applying the 1st embodiment of the present invention to the cooperation node (point) transmission range control method is explained.

First of all, referring to FIG. 19, a base station sends information, which indicates that the JT scheme is applicable if an elevation beamforming angle of a node #1 is equal to or greater than a 1st threshold and an elevation beamforming angle of a node #2 is equal to or greater than a 2nd threshold, to a user equipment existing between the node #1 ad the node #2.

Having received the information, the user equipment measures a pilot (e.g., CSI-RS) transmitted from the node #1 and a pilot (e.g., CSI-RS) transmitted from the node #2 and is then able to report JT scheme applicability to the base station. Alternatively, after the user equipment has measured the pilots (e.g., CSI-RS) respectively transmitted from the node #1 and the node #2, if the user equipment is located in a JT scheme applicable area, the user equipment calculates and feeds back CSI on the assumption that the signals are received from the node #1 and the node #2 by the JT scheme.

For instance, CQI and RI are calculated and reported by assuming the application of the JT scheme together with information on a phase difference between the PMI for each of the node #1 and the node #2 and each PMI.

In addition, in case that the user equipment is located in a transmission area of one of the node #1 or the node #2, the user equipment can calculate and feed back the CSI by assuming CS/CB scheme application or DPS scheme application.

2nd Embodiment

Meanwhile, in case of the 1st embodiment of the present invention, if a user equipment can obtain an elevation beamforming angle, it is valid. Yet, the user equipment may not be able to identify an elevation beamforming angle and a horizontal beamforming angle from each other depending on how a system supports a 3D beamforming. For instance, if the multiple CSI-RS configuration defined in the LTE system is used, a base station transmits CSI-RS from vertical antennas in one planar array based on one CSI-RS pattern and is also able to selectively transmit CSI-RS from horizontal antennas using another CSI-RS pattern. In doing so, a user equipment can select and report a preferred PMI in accordance with each CSI-RS without recognizing whether a corresponding CSI-RS configuration is for the usage of an elevation beamforming or a horizontal beamforming.

Therefore, according to a 2nd embodiment of the present invention, a base station sets up single or multiple PMI codebook subset restrictions on a single pilot pattern (or a single pilot resource) for a user equipment and then informs the user equipment of a transmission mode applicable to a restricted PMI codebook subset or a non-restricted PMI codebook subset and/or a feedback configuration information of the user equipment. In this case, the pilot pattern is conceptionally identical or similar to a reference signal of an LTE system.

Moreover, the user equipment can feed back at least one of informations shown in Table 8 using the transmission mode applicable to the restricted PMI codebook subset and/or the transmission mode applicable to the non-restricted PMI codebook and/or the feedback configuration information of the user equipment, which are received from the base station.

TABLE 8

Available or preferred transmission mode (e.g., JT available or preferred, specific transmission mode available or preferred)
CSI calculated and/or configured based on an available or preferred transmission mode
Available or preferred PMI
CSI calculated and/or configured based on an available or preferred PMI The PMI codebook subset restriction is the terminology on the assumption of a structure to which a PMI codebook based MIMO precoding is applied, by which the restriction may be non-limited. For instance, a beamforming angle is indexed in accordance with a corresponding range and an index range is replaced by a PMI codebook subset to be used for control information or feedback information.

In the following description, one example of applying the 2nd embodiment of the present invention to the cooperation node (point) transmission range control method is explained. Particularly, assume a case that multiple codebook restrictions are put on a single pilot pattern.

First of all, a base station informs a user equipment of 2 PMI codebook subsets for a pilot pattern (e.g., CSI-RS pattern) transmitted by a node #1. In particular, the 1st codebook subset is a set of PMIs corresponding to a case that an elevation beamforming angle of the node #1 is equal to or greater than a 1st threshold, while the 2nd codebook subset is a set of PMIs corresponding to a case that the elevation beamforming angle of the node #1 is smaller than the 1st threshold.

Likewise, the base station informs the user equipment of 2 PMI codebook subsets for a CSI-RS pattern transmitted by a node #2. In particular, the 1st codebook subset is a set of PMIs corresponding to a case that an elevation beamforming angle of the node #2 is equal to or greater than a 2nd threshold, while the 2nd codebook subset is a set of PMIs corresponding to a case that the elevation beamforming angle of the node #2 is smaller than the 2nd threshold.

Subsequently, if a PMI preferred by the user equipment corresponds to the 1st codebook subset of the node #1 and the 1st codebook subset of the node #2, the base station informs the user equipment that the JT scheme is activated. After the user equipment has measured the CSI-RS transmitted from each of the node #1 and the node #2, the user equipment can report information indicating whether the JT scheme is applicable to the base station.

Alternatively, after the user equipment has measured the CSI-RS transmitted from each of the node #1 and the node #2, if the user equipment is located in a JT scheme applicable area, the user equipment can calculate and/or configure and then feed back CSI on the assumption of JT scheme application. For instance, the user equipment reports information on a phase difference between the PMI for the node #1 and the node #2 and each PMI and also reports CQI and RI by calculating the CQI and RI on the assumption of the JT scheme additionally.

Moreover, if the user equipment is located in a transmission area of either the node #1 or the node #2, the user equipment can calculate and feed back CSI to the base station on the assumption of CS/CB scheme application or DPS scheme application.

Although the above-mentioned example relates to the case that multiple codebook subsets restricted on a pilot transmitted by a single node are indicated, such an operation is also available for a case of restricting a single codebook subset. Particularly, assume a case that a single codebook restriction is performed on a single pilot pattern.

First of all, a base station informs a user equipment of 1 PMI codebook subset for a CSI-RS pattern transmitted by a node #1. In particular, the corresponding codebook subset is a set of PMIs corresponding to a case that an elevation beamforming angle of the node #1 is equal to or greater than a 1st threshold. Likewise, the base station informs the user equipment of 1 PMI codebook subset for a CSI-RS pattern transmitted by a node #2. In particular, the corresponding codebook subset is a set of PMIs corresponding to a case that an elevation beamforming angle of the node #2 is equal to or greater than a 2nd threshold.

If the PMI preferred by the user equipment corresponds to both of the codebook subset of the node #1 and the codebook subset of the node #2, the base station informs the user equipment that the JT scheme can be activated. The base station may inform the user equipment that the CB scheme can be activated for the PMI deviating from a range of a restricted PMI codebook subset and may additionally inform the user equipment that the DPS scheme will be activated for all PMI codebooks or an unrestricted PMI. Since an operation of the user equipment is the same as the case of performing multiple codebook restrictions on a single pilot pattern, its details shall be omitted from the following description.

Figure 21:
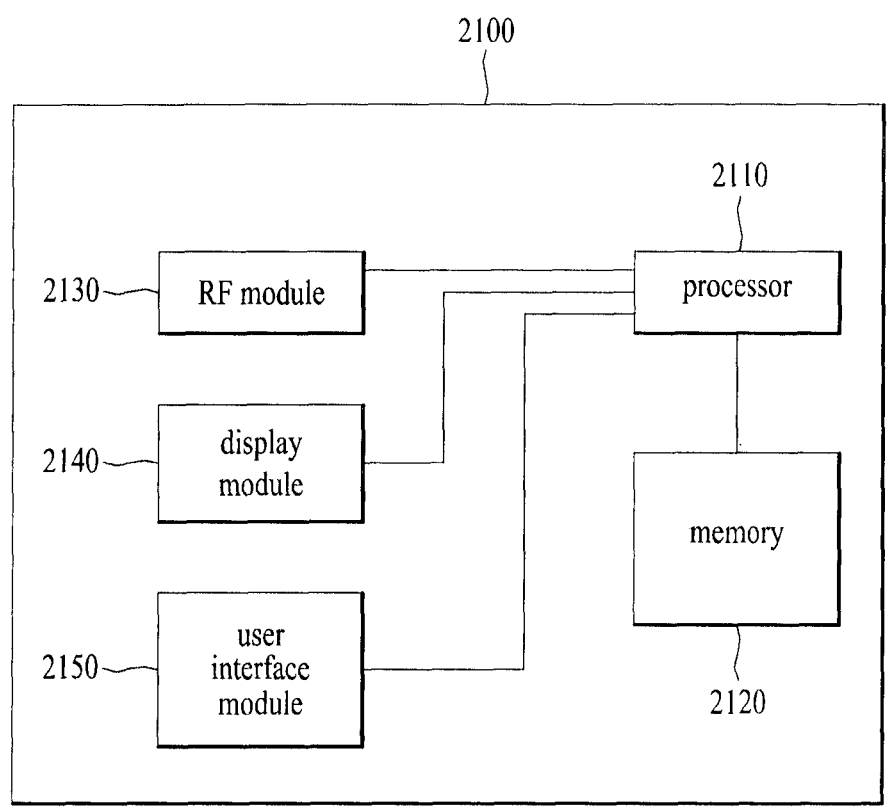
FIG. 21 is a block diagram for one example of a communication device according to one embodiment of the present invention.

FIG. 21 is a block diagram for one example of a communication device according to one embodiment of the present invention.

Referring to FIG. 21, a communication device 2100 includes a processor 2110, a memory 2120, an RF module 2130, a display module 2140 and a user interface module 2150.

The communication device 2100 is illustrated for clarity and convenience of the description and some modules can be omitted. Moreover, the communication device 2100 is able to further include at least one necessary module. And, some modules of the communication device 2100 can be further divided into sub-modules. The processor 2110 is configured to perform operations according to the embodiment of the present invention exemplarily described with reference to the accompanying drawings. In particular, the detailed operations of the processor 2110 can refer to the contents described with reference to FIGS. 1 to 20.

The memory 2120 is connected to the processor 2110 and stores operating systems, applications, program codes, data and the like. The RF module 2130 is connected to the processor 2110 and performs a function of converting a baseband signal to a radio signal or converting a radio signal to a baseband signal. For this, the RF module 2130 performs analog conversion, amplification, filtering and frequency uplink transform or inverse processes thereof. The display module 2140 is connected to the processor 2110 and displays various kinds of informations. The display module 2140 can include such a well-known element as LCD (Liquid Crystal Display), LED (Light Emitting Diode), OLED (Organic Light Emitting Diode) and the like, by which the present invention is non-limited. The user interface module 2150 is connected to the processor 2110 and can include a combination of well-known interfaces including a keypad, a touchscreen and the like.

The above-described embodiments correspond to combination of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparent that an embodiment can be configured by combining claims, which are not explicitly cited in-between, together without departing from the spirit and scope of 'what is claimed is' or that those claims can be included as new claims by revision after filing an application.

In this disclosure, a specific operation explained as performed by a base station can be performed by an upper node of the base station in some cases. In particular, in a network constructed with a plurality of network nodes including a base station, it is apparent that various operations performed for communication with a terminal can be performed by a base station or other network nodes except the base station. In this case, 'base station' can be replaced by such a terminology as a fixed station, a Node B, an eNode B (eNB), an access point and the like.

Embodiments of the present invention can be implemented using various means. For instance, embodiments of the present invention can be implemented using hardware, firmware, software and/or any combinations thereof. In case of the implementation by hardware, a method according to one embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method of reporting channel state information for vertical beam forming in a multicell based wireless communication system and apparatus therefor are described mainly with reference to examples applied to 3GPP LTE system, as mentioned in the foregoing description, the present invention is applicable to various kinds of wireless communication systems as well as the 3GPP LTE system.

The invention claimed is:

1. A method of reporting channel state information by a user equipment in a wireless communication system, the method comprising:
receiving, from a serving node, information on vertical beamforming angles of the serving node and a cooperation node, respectively,
wherein the information on the vertical beamforming angles comprises information on at least one cooperative transmission mode determined based on the vertical beamforming angle of the serving node and the vertical beamforming angle of the cooperation node, and
wherein the at least one cooperative transmission mode comprises one of a joint transmission scheme and a coordinated beamforming scheme;
generating the channel state information for a cooperative transmission mode preferred by the user equipment among the at least one cooperative transmission mode; and
reporting the channel state information to the serving node,
wherein the joint transmission scheme corresponds to a case where the vertical beamforming angle of the serving node is equal to or greater than a first threshold and the vertical beamforming angle of the cooperative node is equal to or greater than a second threshold, wherein the coordinated beamforming scheme corresponds to a case where the vertical beamforming angle of the serving node is less than the first threshold or the vertical beamforming angle of the cooperative node is less than the second threshold, and wherein the first threshold corresponds to a minimum angle of which the serving node is able to perform joint transmission with the cooperative node and the second threshold corresponds to a minimum angle of which the cooperative node is able to perform joint transmission with the serving node.

2. The method of claim 1, wherein the channel station information further comprises at least one of channel quality information available for the cooperative transmission mode preferred by the user equipment and information on the vertical beamforming angles of the serving node and the cooperation node.

3. The method of claim 2, wherein the information on the vertical beamforming angles comprises a codebook index corresponding to one of the vertical beamforming angles.

4. The method of claim 1, wherein the information on the vertical beamforming angles of the serving node and the cooperation node further comprises information on at least one $1^{st}$ codebook subset for the serving node and information on at least one $2^{nd}$ codebook subset for the cooperation node.

5. The method of claim 4, wherein the at least one $1^{st}$ codebook subset comprises a codebook subset corresponding to one of the vertical beamforming angles, which is equal to or greater than the first threshold, of the serving node, and wherein the at least one $2^{nd}$ codebook subset comprises a codebook subset corresponding to the vertical beamforming angle, which is equal to or greater than the second threshold, of the cooperation node.

6. The method of claim 5, wherein the generating of the channel state information for the cooperative transmission mode further includes calculating a $1^{st}$ precoding matrix index for the serving node and a $2^{nd}$ precoding matrix index for the cooperation node, and wherein information on the specific cooperative transmission mode referred by the user equipment included in the channel state information is determined depending on whether the $1^{st}$ precoding matrix index is included in the $1^{st}$ codebook subset and whether the $2^{nd}$ precoding matrix index is included in the $2^{nd}$ codebook subset.

7. The method of claim 1, wherein when the cooperative transmission mode preferred by the user equipment corresponds to the joint transmission scheme, the channel state information is generated on an assumption that the user equipment receives signals from the serving node and the coordinate node using the joint transmission scheme, and wherein when the cooperative transmission mode preferred by the user equipment corresponds to coordinated beamforming scheme, the channel state information is generated on an assumption that the user equipment receives signals from the serving node and the coordinate node using the coordinate beamforming scheme.

8. A user equipment in a wireless communication system, the user equipment comprising:

a wireless communication module configured to transceive signals with at least one of a serving node and a cooperation node, the wireless communication module configured to receive, from the serving node, information on vertical beamforming angles of the serving node and a cooperation node, respectively, wherein the information on the vertical beamforming angles comprises information on at least one cooperative transmission mode determined based on the vertical beamforming angle of the serving node and the vertical beamforming angle of the cooperation node, and wherein the at least one cooperative transmission mode comprises one of a joint transmission scheme and a coordinated beamforming scheme; and a processor configured to process the signals, the processor being further configured to:

generate channel state information for a cooperative transmission mode preferred by the user equipment among the at least one cooperative transmission mode, and control the wireless communication module to report the channel state information to the serving node, wherein the joint transmission scheme corresponds to a case where the vertical beamforming angle of the serving node is equal to or greater than a first threshold and the vertical beamforming angle of the cooperative node is equal to or greater than a second threshold, wherein the coordinated beamforming scheme corresponds to a case where the vertical beamforming angle of the serving node is less than the first threshold or the vertical beamforming angle of the cooperative node is less than the second threshold, and wherein the first threshold corresponds to a minimum angle of which the serving node is able to perform joint transmission with the cooperative node and the second threshold corresponds to a minimum angle of which the cooperative node is able to perform joint transmission with the serving node.

9. The user equipment of claim 8, wherein the channel station information further comprises at least one of channel quality information available for the cooperative transmission mode preferred by the user equipment and information on the vertical beamforming angles of the serving node and the cooperation node.

10. The user equipment of claim 9, wherein the information on the vertical beamforming angles comprises a codebook index corresponding to the vertical beamforming angles.

11. The user equipment of claim 8, wherein the information on the vertical beamforming angles of the serving node and the cooperation node further comprises information on at least one $1^{st}$ codebook subset for the serving node and information on at least one $2^{nd}$ codebook subset for the cooperation node.

12. The user equipment of claim 11, wherein the at least one 1.sup.st codebook subset comprises a codebook subset corresponding to one of the vertical beamforming angles, which is equal to or greater than the first threshold, of the serving node, and wherein the at least one 2.sup.nd codebook subset comprises a codebook subset corresponding to the vertical beamforming angle, which is equal to or greater than the second threshold, of the cooperation node.

13. The user equipment of claim 12, wherein, to generate the channel state information for the cooperative transmission mode, the processor is further configured to calculate a $1^{st}$ precoding matrix index for the serving node and a $2^{nd}$ precoding matrix index for the cooperation node, and wherein information on the specific cooperative transmission mode preferred by the user equipment included in the channel state information is determined depending on whether the $1^{st}$ precoding matrix index is included in the $1^{st}$ codebook subset and whether the $2^{nd}$ precoding matrix index is included in the $2^{nd}$ codebook subset.

* * * * *